United States Patent
Ye et al.

(10) Patent No.: US 12,382,066 B2
(45) Date of Patent: Aug. 5, 2025

(54) CHROMA FROM LUMA PREDICTION USING MAPPING AND DIFFERENT TYPES

(71) Applicant: Tencent America LLC, Palo Alto, CA (US)

(72) Inventors: Jing Ye, San Jose, CA (US); Xin Zhao, San Jose, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 252 days.

(21) Appl. No.: 17/951,931

(22) Filed: Sep. 23, 2022

(65) Prior Publication Data

US 2023/0336748 A1  Oct. 19, 2023

Related U.S. Application Data

(60) Provisional application No. 63/332,567, filed on Apr. 19, 2022.

(51) Int. Cl.
| | | |
|---|---|---|
| *H04N 19/186* | (2014.01) | |
| *H04N 19/105* | (2014.01) | |
| *H04N 19/11* | (2014.01) | |
| *H04N 19/132* | (2014.01) | |
| *H04N 19/176* | (2014.01) | |
| *H04N 19/593* | (2014.01) | |
| *H04N 19/70* | (2014.01) | |

(52) U.S. Cl.
CPC ......... *H04N 19/186* (2014.11); *H04N 19/105* (2014.11); *H04N 19/11* (2014.11);
(Continued)

(58) Field of Classification Search
CPC .... H04N 19/186; H04N 19/105; H04N 19/11; H04N 19/132; H04N 19/176;
(Continued)

(56) References Cited

U.S. PATENT DOCUMENTS

| | | |
|---|---|---|
| 2013/0136174 A1 | 5/2013 | Xu et al. |
| 2013/0188703 A1 | 7/2013 | Liu et al. |

(Continued)

FOREIGN PATENT DOCUMENTS

| | | |
|---|---|---|
| WO | WO 2021/083376 A1 | 5/2021 |
| WO | WO 2021/138354 A1 | 7/2021 |

OTHER PUBLICATIONS

International Search Report and Written Opinion of PCT application PCT/US22/47256 dated May 4, 2023, 11 pages.

(Continued)

*Primary Examiner* — Boubacar Abdou Tchoussou
(74) *Attorney, Agent, or Firm* — Morgan, Lewis & Bockius LLP

(57) ABSTRACT

This disclosure relates to video processing that includes: determining that a chroma block is to be predicted in a Chroma from Luma (CfL) mode, wherein the chroma block corresponds to a luma block; mapping a plurality of luma samples of the luma block to a plurality of neighbor chroma samples in at least one neighbor chroma block that neighbors the chroma block; and performing a CfL prediction of the chroma block using the plurality of neighbor chroma samples as a plurality of prediction samples of the chroma block. This disclosure also relates to video processing that includes: determining a type of chroma from luma (CfL) prediction process from among a plurality of different types of CfL prediction processes; and performing a CfL prediction process according to the type of CfL prediction process.

20 Claims, 30 Drawing Sheets

(52) U.S. Cl.
CPC ......... *H04N 19/132* (2014.11); *H04N 19/176* (2014.11); *H04N 19/593* (2014.11); *H04N 19/70* (2014.11)

(58) Field of Classification Search
CPC .... H04N 19/593; H04N 19/70; H04N 19/136; H04N 19/159; H04N 19/13
See application file for complete search history.

(56) References Cited

U.S. PATENT DOCUMENTS

| | | |
|---|---|---|
| 2014/0294078 A1 | 10/2014 | Seregin et al. |
| 2021/0092395 A1 | 3/2021 | Zhang et al. |
| 2021/0314581 A1 | 10/2021 | Ma et al. |
| 2022/0191526 A1* | 6/2022 | Aggarwal ............ H04N 19/186 |
| 2022/0337847 A1* | 10/2022 | Chen ................... H04N 19/132 |

OTHER PUBLICATIONS

Luc N. Trudeau et al., "*Predicting Chroma from Luma in AV1*", 2018 Data Compression Conference, pp. 374-382 (9 pages).

Yue Chen, et al. "*An Overview of Core Coding Tolls in the AV1 Video Codec*", 2018 IEEE, pp. 41-45 (5 pages).

Peter de Rivaz, et al., "*AV1 Bistream & Decoding Process Specification*", Jan. 8, 2019 (681 pages).

Xin Zhao, "*Tool Description for AV1 and libaom*", Oct. 4, 2021, Alliance for Open Media Codec Working Group (41 pages).

* cited by examiner

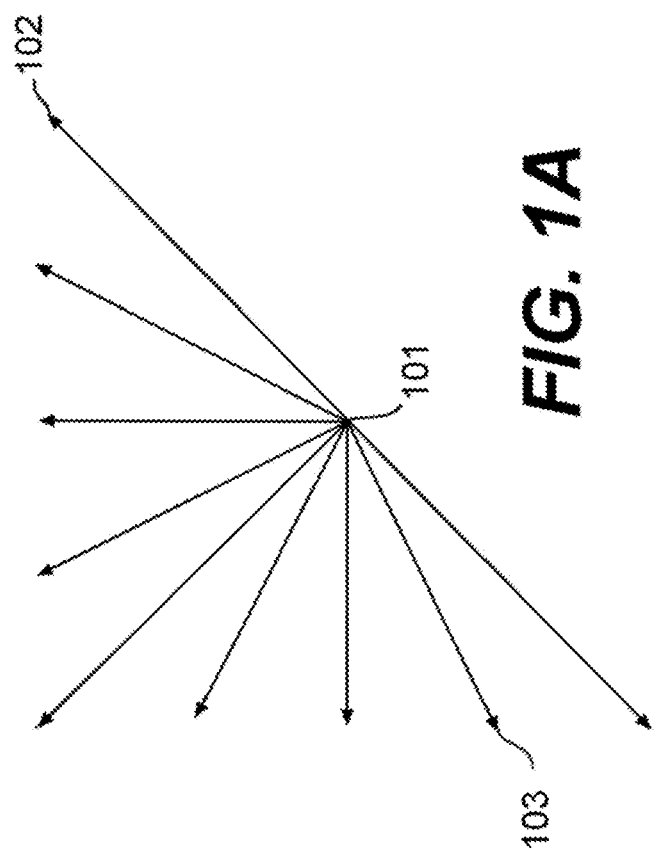
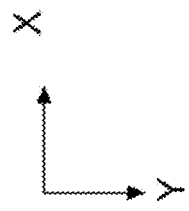
FIG. 1A

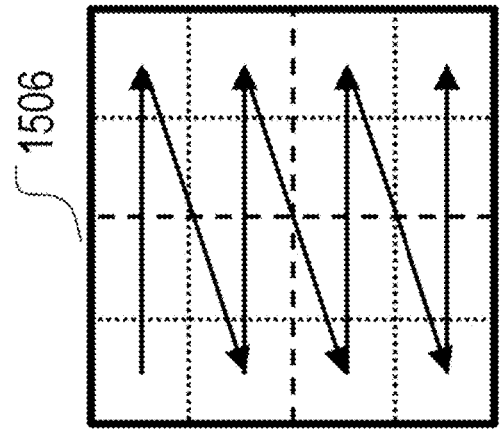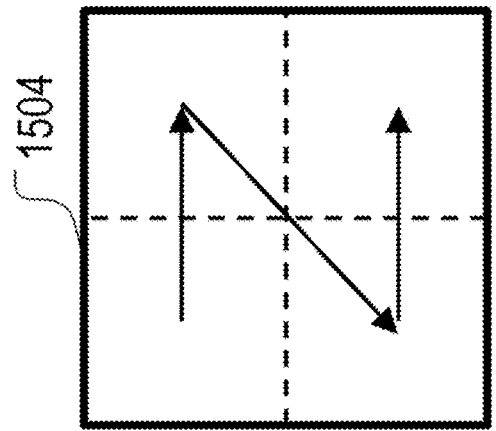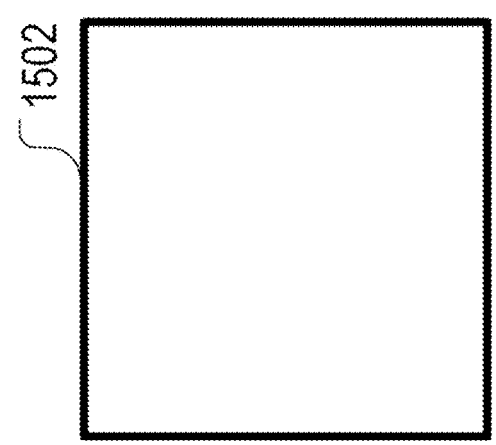
FIG. 15
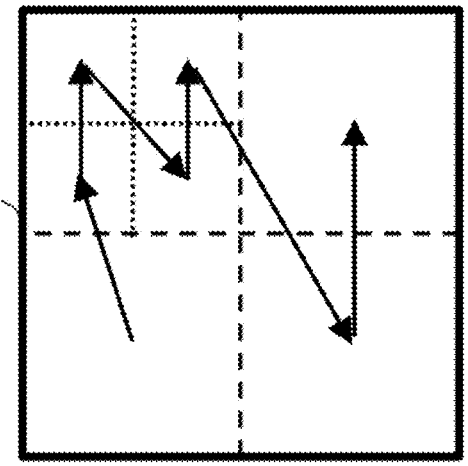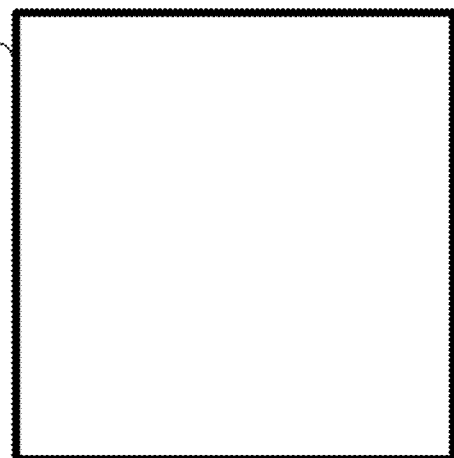
FIG. 16

CHROMA FROM LUMA PREDICTION USING MAPPING AND DIFFERENT TYPES

INCORPORATION BY REFERENCE

This application is based on and claims the benefit of priority to U.S. Provisional Application No. 63/332,567, entitled "IMPROVED SIGNALING METHOD FOR CHROMA FROM LUMA INTRA PREDICTION MODE", filed on Apr. 19, 2022, which is herein incorporated by reference in its entirety.

TECHNICAL FIELD

This disclosure describes a set of advanced video coding technologies. More specifically, the disclosed technology involves chroma from luma prediction.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or sub-sampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma sub sampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge 101 represents the sample being predicted. The arrows represent the direction from which neighboring samples are used to predict the sample at 101. For example, arrow 102 indicates that sample 101 is predicted from a neighboring sample or samples to the upper right, at a 45 degree angle from the horizontal direction. Similarly, arrow 103 indicates that sample 101 is predicted from a neighboring sample or samples to the lower left of sample 101, in a 22.5 degree angle from the horizontal direction.

Still referring to FIG. 1A, on the top left there is depicted a square block 104 of 4×4 samples (indicated by a dashed, boldface line). The square block 104 includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block 104 in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block 104. In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow 102—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic 180 that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

Aspects of the disclosure provide methods and apparatuses for chroma from luma (CfL) prediction.

In some implementations, a method for video processing includes: determining that a chroma block is to be predicted in a Chroma from Luma (CfL) mode, wherein the chroma block corresponds to a luma block; mapping a plurality of luma samples of the luma block to a plurality of neighbor chroma samples in at least one neighbor chroma block that neighbors the chroma block; and performing a CfL prediction of the chroma block using the plurality of neighbor chroma samples as a plurality of prediction samples of the chroma block.

In some other implementations, a method for video processing includes: determining a type of chroma from luma (CfL) prediction process from among a plurality of different types of CfL prediction processes; and performing a CfL prediction process according to the type of CfL prediction process.

In some other implementations, a device for processing video information is disclosed. The device may include a circuitry configured to perform any one of the method implementations above.

Aspects of the disclosure also provide non-transitory computer-readable mediums storing instructions which when executed by a computer for video decoding and/or encoding cause the computer to perform the methods for video processing.

BRIEF DESCRIPTION OF THE DRAWINGS

Further features, the nature, and various advantages of the disclosed subject matter will be more apparent from the following detailed description and the accompanying drawings in which:

FIG. 1A shows a schematic illustration of an exemplary subset of intra prediction directional modes.

FIG. 15 shows a scheme for partitioning a coding block into multiple transform blocks and coding order of the transform blocks according to example embodiments of the disclosure;

FIG. 16 shows another scheme for partitioning a coding block into multiple transform blocks and coding order of the transform block according to example embodiments of the disclosure;

DETAILED DESCRIPTION OF EMBODIMENTS

Figure 3:
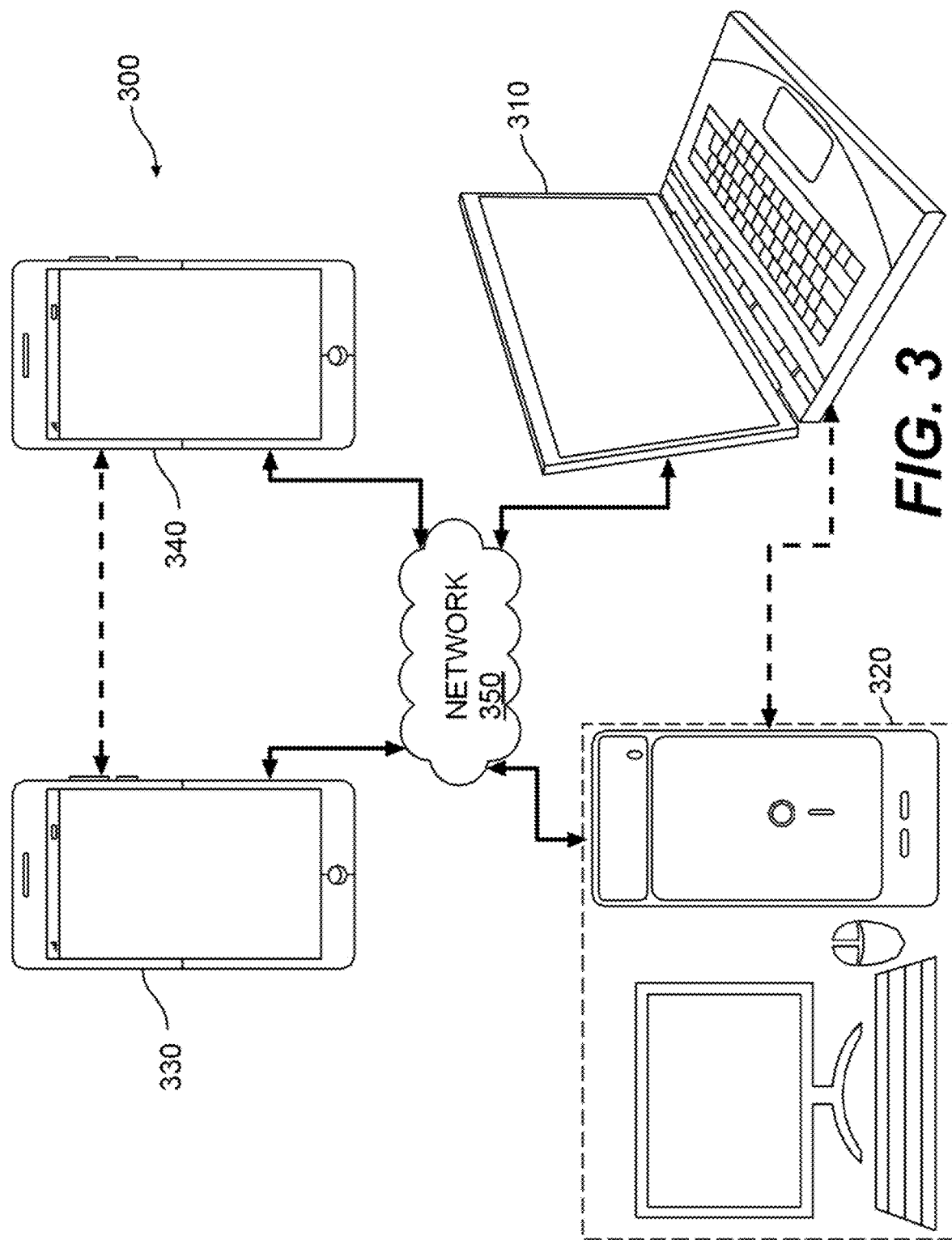
FIG. 3 shows a schematic illustration of a simplified block diagram of a communication system 300 in accordance with an example embodiment.

FIG. 3 illustrates a simplified block diagram of a communication system 300 according to an embodiment of the present disclosure. The communication system 300 includes a plurality of terminal devices that can communicate with each other, via, for example, a network 350. For example, the communication system 300 includes a first pair of terminal devices 310 and 320 interconnected via the network 350. In the example of FIG. 3, the first pair of terminal devices 310 and 320 may perform unidirectional transmission of data. For example, the terminal device 310 may code video data (e.g., of a stream of video pictures that are captured by the terminal device 310) for transmission to the other terminal device 320 via the network 350. The encoded video data can be transmitted in the form of one or more coded video bitstreams. The terminal device 320 may receive the coded video data from the network 350, decode the coded video data to recover the video pictures and display the video pictures according to the recovered video data. Unidirectional data transmission may be implemented in media serving applications and the like.

In another example, the communication system 300 includes a second pair of terminal devices 330 and 340 that perform bidirectional transmission of coded video data that may be implemented, for example, during a videoconferencing application. For bidirectional transmission of data, in an example, each terminal device of the terminal devices 330 and 340 may code video data (e.g., of a stream of video pictures that are captured by the terminal device) for transmission to the other terminal device of the terminal devices 330 and 340 via the network 350. Each terminal device of the terminal devices 330 and 340 also may receive the coded video data transmitted by the other terminal device of the terminal devices 330 and 340, and may decode the coded video data to recover the video pictures and may display the video pictures at an accessible display device according to the recovered video data.

In the example of FIG. 3, the terminal devices 310, 320, 330 and 340 may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network 350 represents any number or types of networks that convey coded video data among the terminal devices 310, 320, 330 and 340, including for example wireline (wired) and/or wireless communication networks. The communication network 350 may exchange data in circuit-switched, packet-switched, and/or other types of channels. Representative networks include telecommunications networks, local area networks, wide area networks and/or the Internet. For the purposes of the present discussion, the architecture and topology of the network 350 may be immaterial to the operation of the present disclosure unless explicitly explained herein.

Figure 4:
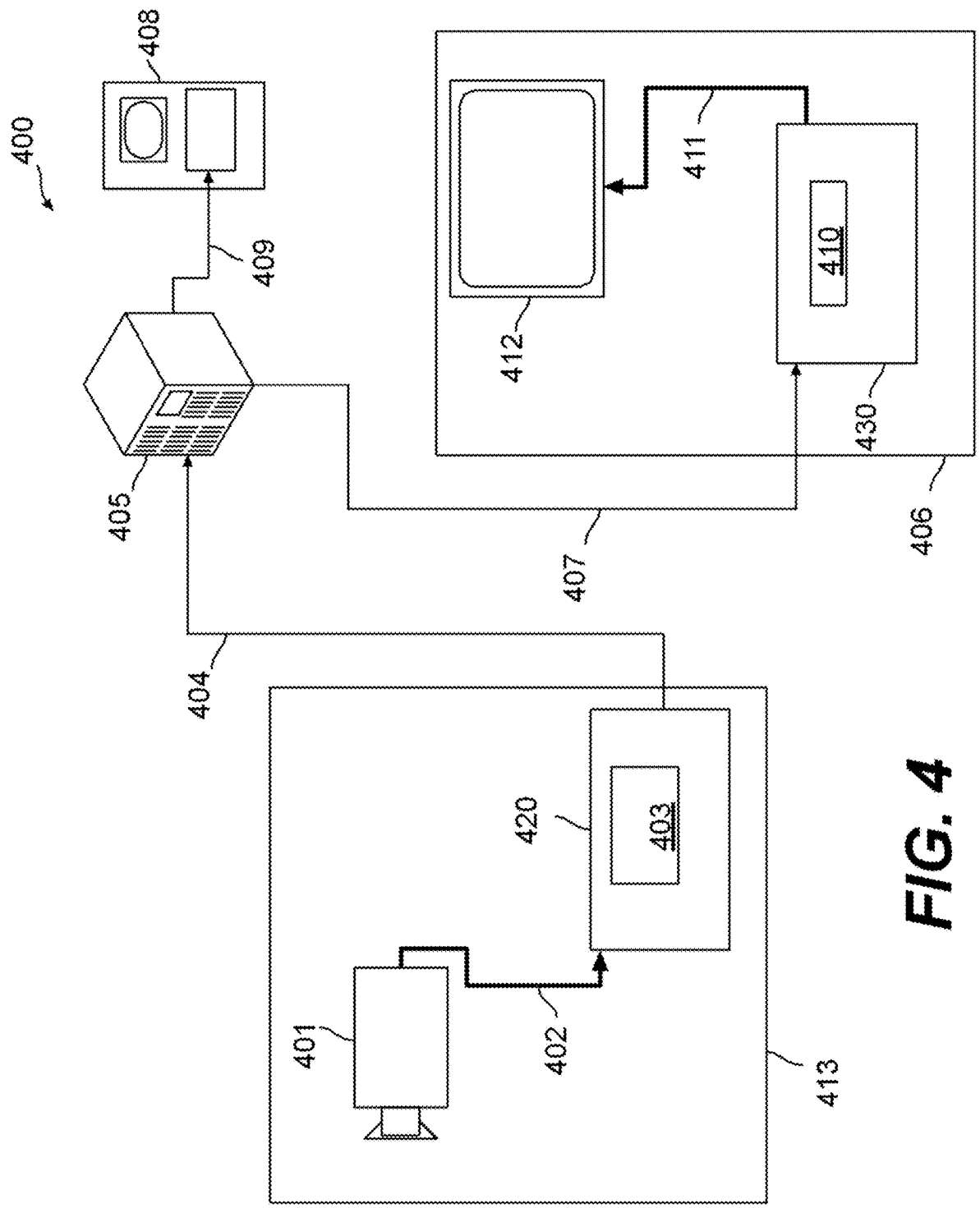
FIG. 4 shows a schematic illustration of a simplified block diagram of a communication system 400 in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem 413 that can include a video source 401, e.g., a digital camera, for creating a stream of video pictures or images 402 that are uncompressed. In an example, the stream of video pictures 402 includes samples that are recorded by a digital camera of the video source 401. The stream of video pictures 402, depicted as a bold line to emphasize a high data volume when compared to encoded video data 404 (or coded video bitstreams), can be processed by an electronic device 420 that includes a video encoder 403 coupled to the video source 401. The video encoder 403 can include hardware, software, or a combination thereof to enable or implement aspects of the disclosed subject matter as described in more detail below. The encoded video data 404 (or encoded video bitstream 404), depicted as a thin line to emphasize a lower data volume when compared to the stream of uncompressed video pictures 402, can be stored on a streaming server 405 for future use or directly to downstream video devices (not shown). One or more streaming client subsystems, such as client subsystems 406 and 408 in FIG. 4 can access the streaming server 405 to retrieve copies 407 and 409 of the encoded video data 404. A client subsystem 406 can include a video decoder 410, for example, in an electronic device 430. The video decoder 410 decodes the incoming copy 407 of the encoded video data and creates an outgoing stream of video pictures 411 that are uncompressed and that can be rendered on a display 412 (e.g., a display screen) or other rendering devices (not depicted). The video decoder 410 may be configured to perform some or all of the various functions described in this disclosure. In some streaming systems, the encoded video data 404, 407, and 409 (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices 420 and 430 can include other components (not shown). For example, the electronic device 420 can include a video decoder (not shown) and the electronic device 430 can include a video encoder (not shown) as well.

Figure 5:
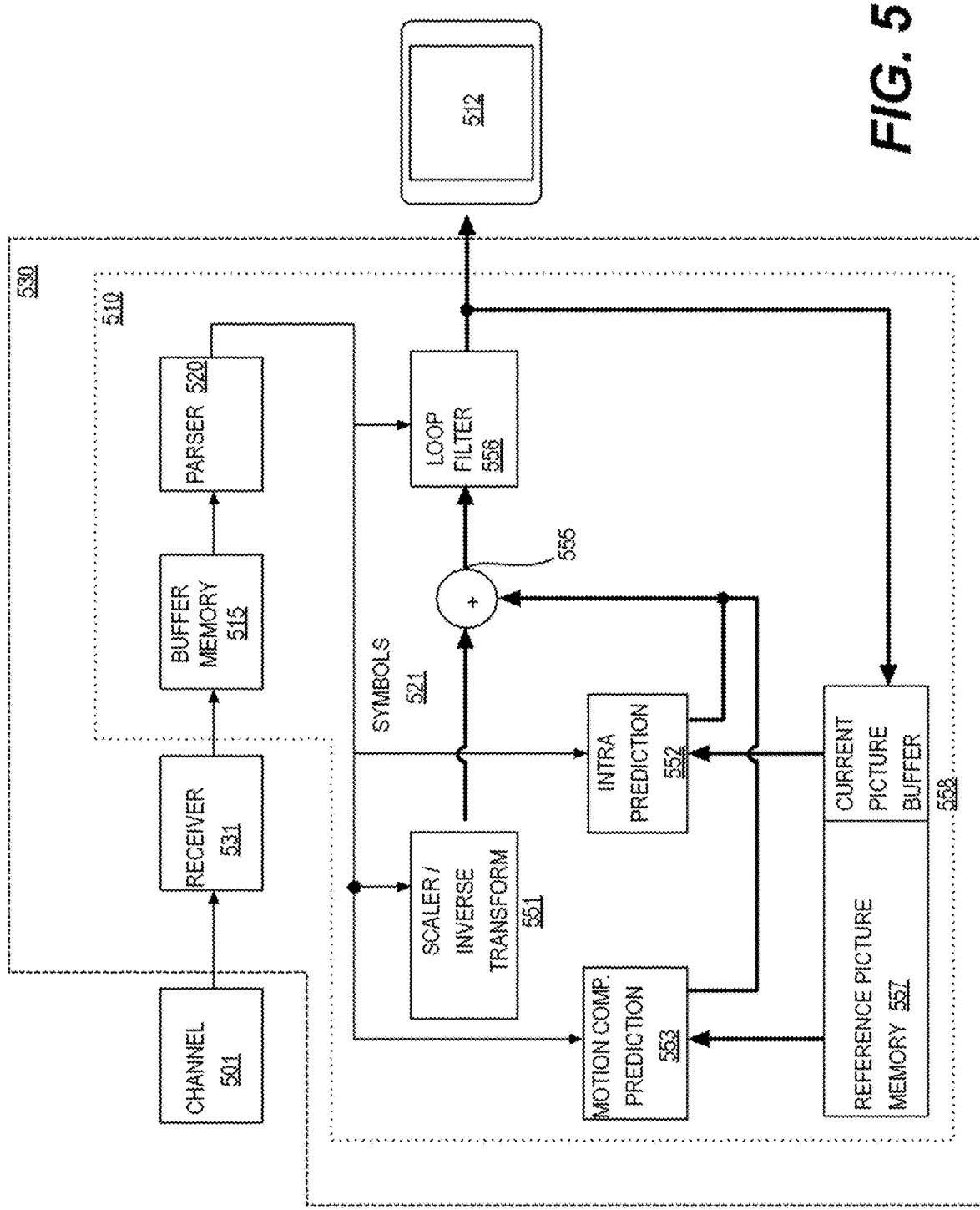
FIG. 5 shows a schematic illustration of a simplified block diagram of a video decoder in accordance with an example embodiment.

FIG. 5 shows a block diagram of a video decoder 510 according to any embodiment of the present disclosure below. The video decoder 510 can be included in an electronic device 530. The electronic device 530 can include a receiver 531 (e.g., receiving circuitry). The video decoder 510 can be used in place of the video decoder 410 in the example of FIG. 4.

The receiver 531 may receive one or more coded video sequences to be decoded by the video decoder 510. In the same or another embodiment, one coded video sequence may be decoded at a time, where the decoding of each coded video sequence is independent from other coded video sequences. Each video sequence may be associated with multiple video frames or images. The coded video sequence may be received from a channel 501, which may be a hardware/software link to a storage device which stores the encoded video data or a streaming source which transmits the encoded video data. The receiver 531 may receive the encoded video data with other data such as coded audio data and/or ancillary data streams, that may be forwarded to their respective processing circuitry (not depicted). The receiver 531 may separate the coded video sequence from the other data. To combat network jitter, a buffer memory 515 may be disposed in between the receiver 531 and an entropy decoder/parser 520 ("parser 520" henceforth). In certain applications, the buffer memory 515 may be implemented as part of the video decoder 510. In other applications, it can be outside of and separate from the video decoder 510 (not depicted). In still other applications, there can be a buffer memory (not depicted) outside of the video decoder 510 for the purpose of, for example, combating network jitter, and there may be another additional buffer memory 515 inside the video decoder 510, for example to handle playback timing. When the receiver 531 is receiving data from a store/forward device of sufficient bandwidth and controllability, or from an isosynchronous network, the buffer memory 515 may not be needed, or can be small. For use on best-effort packet networks such as the Internet, the buffer memory 515 of sufficient size may be required, and its size can be comparatively large. Such buffer memory may be implemented with an adaptive size, and may at least partially be implemented in an operating system or similar elements (not depicted) outside of the video decoder 510.

The video decoder 510 may include the parser 520 to reconstruct symbols 521 from the coded video sequence. Categories of those symbols include information used to manage operation of the video decoder 510, and potentially information to control a rendering device such as display 512 (e.g., a display screen) that may or may not an integral part of the electronic device 530 but can be coupled to the electronic device 530, as is shown in FIG. 5. The control information for the rendering device(s) may be in the form of Supplemental Enhancement Information (SEI messages) or Video Usability Information (VUI) parameter set fragments (not depicted). The parser 520 may parse/entropy-decode the coded video sequence that is received by the parser 520. The entropy coding of the coded video sequence can be in accordance with a video coding technology or standard, and can follow various principles, including variable length coding, Huffman coding, arithmetic coding with or without context sensitivity, and so forth. The parser 520 may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser 520 may also extract from the coded video sequence information such as transform coefficients (e.g., Fourier transform coefficients), quantizer parameter values, motion vectors, and so forth.

The parser 520 may perform an entropy decoding/parsing operation on the video sequence received from the buffer memory 515, so as to create symbols 521.

Reconstruction of the symbols 521 can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser 520. The flow of such subgroup control information between the parser 520 and the multiple processing or functional units below is not depicted for simplicity.

Beyond the functional blocks already mentioned, the video decoder 510 can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit 551. The scaler/inverse transform unit 551 may receive a quantized transform coefficient as well as control information, including information indicating which type of inverse transform to use, block size, quantization factor/parameters, quantization scaling matrices, and the lie as symbol(s) 521 from the parser 520. The scaler/inverse transform unit 551 can output blocks comprising sample values that can be input into aggregator 555.

In some cases, the output samples of the scaler/inverse transform 551 can pertain to an intra coded block, i.e., a block that does not use predictive information from previously reconstructed pictures, but can use predictive information from previously reconstructed parts of the current picture. Such predictive information can be provided by an intra picture prediction unit 552. In some cases, the intra picture prediction unit 552 may generate a block of the same size and shape of the block under reconstruction using surrounding block information that is already reconstructed and stored in the current picture buffer 558. The current picture buffer 558 buffers, for example, partly reconstructed current picture and/or fully reconstructed current picture. The aggregator 555, in some implementations, may add, on a per sample basis, the prediction information the intra prediction unit 552 has generated to the output sample information as provided by the scaler/inverse transform unit 551.

In other cases, the output samples of the scaler/inverse transform unit 551 can pertain to an inter coded, and potentially motion compensated block. In such a case, a motion compensation prediction unit 553 can access reference picture memory 557 to fetch samples used for inter-picture prediction. After motion compensating the fetched samples in accordance with the symbols 521 pertaining to the block, these samples can be added by the aggregator 555 to the output of the scaler/inverse transform unit 551 (output of unit 551 may be referred to as the residual samples or residual signal) so as to generate output sample information. The addresses within the reference picture memory 557 from where the motion compensation prediction unit 553 fetches prediction samples can be controlled by motion vectors, available to the motion compensation prediction unit 553 in the form of symbols 521 that can have, for example X, Y components (shift), and reference picture components (time). Motion compensation may also include interpolation of sample values as fetched from the reference picture memory 557 when sub-sample exact motion vectors are in use, and may also be associated with motion vector prediction mechanisms, and so forth.

The output samples of the aggregator 555 can be subject to various loop filtering techniques in the loop filter unit 556. Video compression technologies can include in-loop filter technologies that are controlled by parameters included in the coded video sequence (also referred to as coded video bitstream) and made available to the loop filter unit 556 as symbols 521 from the parser 520, but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit 556 can be a sample stream that can be output to the rendering device 512 as well as stored in the reference picture memory 557 for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser 520), the current picture buffer 558 can become a part of the reference picture memory 557, and a fresh current picture buffer can be reallocated before commencing the reconstruction of the following coded picture.

The video decoder 510 may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver 531 may receive additional (redundant) data with the encoded video. The additional data may be included as part of the coded video sequence(s). The additional data may be used by the video decoder 510 to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
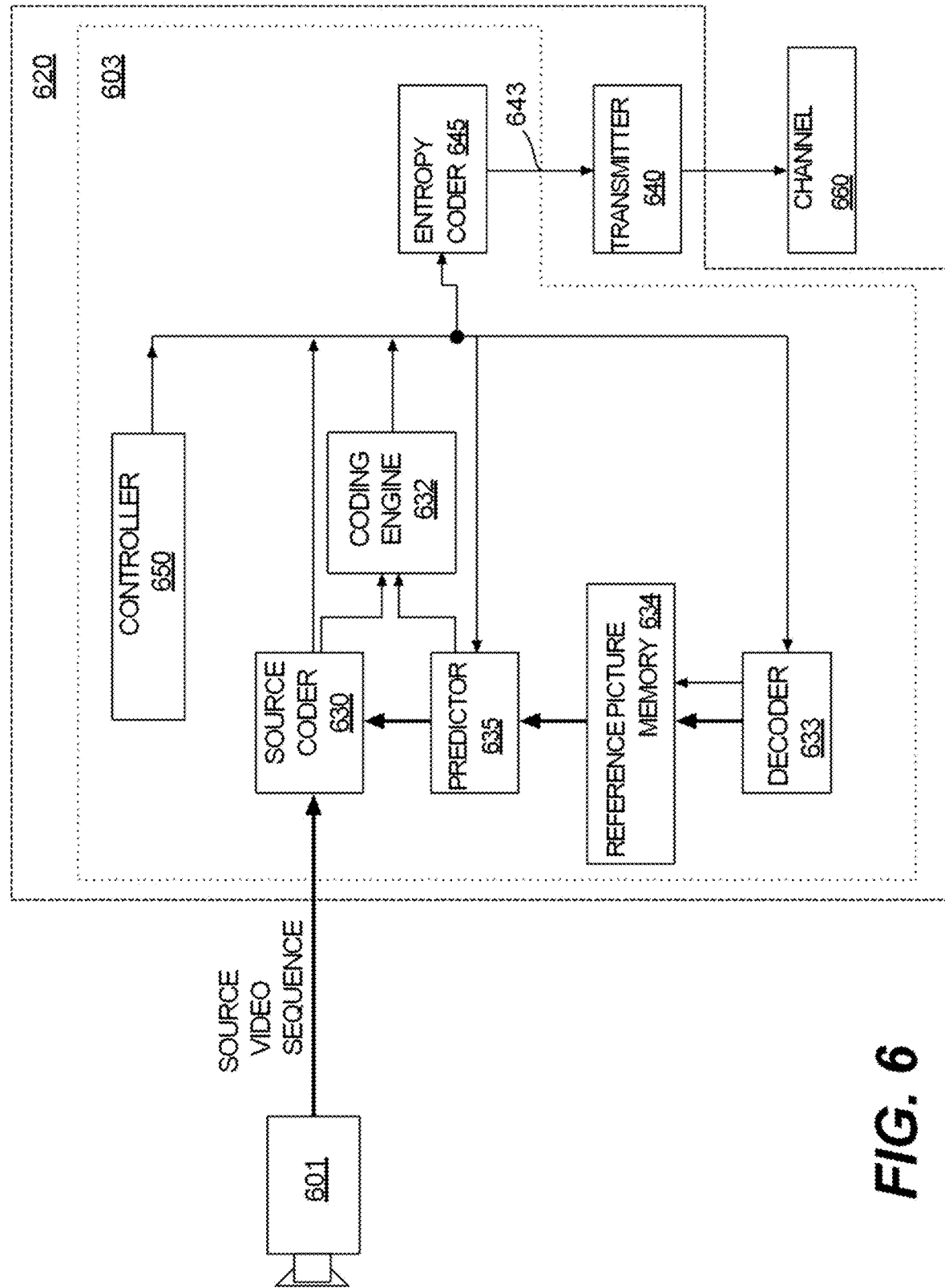
FIG. 6 shows a schematic illustration of a simplified block diagram of a video encoder in accordance with an example embodiment.

FIG. 6 shows a block diagram of a video encoder 603 according to an example embodiment of the present disclosure. The video encoder 603 may be included in an electronic device 620. The electronic device 620 may further include a transmitter 640 (e.g., transmitting circuitry). The video encoder 603 can be used in place of the video encoder 403 in the example of FIG. 4.

The video encoder 603 may receive video samples from a video source 601 (that is not part of the electronic device 620 in the example of FIG. 6) that may capture video image(s) to be coded by the video encoder 603. In another example, the video source 601 may be implemented as a portion of the electronic device 620.

The video source 601 may provide the source video sequence to be coded by the video encoder 603 in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source 601 may be a storage device capable of storing previously prepared video. In a videoconferencing system, the video source 601 may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder 603 may code and compress the pictures of the source video sequence into a coded video sequence 643 in real time or under any other time constraints as required by the application. Enforcing appropriate coding speed constitutes one function of a controller 650. In some embodiments, the controller 650 may be functionally coupled to and control other functional units as described below. The coupling is not depicted for simplicity. Parameters set by the controller 650 can include rate control related parameters (picture skip, quantizer, lambda value of rate-distortion optimization techniques, . . . ), picture size, group of pictures (GOP) layout, maximum motion vector search range, and the like. The controller 650 can be configured to have other suitable functions that pertain to the video encoder 603 optimized for a certain system design.

In some example embodiments, the video encoder 603 may be configured to operate in a coding loop. As an oversimplified description, in an example, the coding loop can include a source coder 630 (e.g., responsible for creating symbols, such as a symbol stream, based on an input picture to be coded, and a reference picture(s)), and a (local) decoder 633 embedded in the video encoder 603. The decoder 633 reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory 634. As the decoding of a symbol stream leads to bit-exact results independent of decoder location (local or remote), the content in the reference picture memory 634 is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder 633 can be the same as of a "remote" decoder, such as the video decoder 510, which has already been described in detail above in conjunction with FIG. 5. Briefly referring also to FIG. 5, however, as symbols are available and encoding/decoding of symbols to a coded video sequence by an entropy coder 645 and the parser 520 can be lossless, the entropy decoding parts of the video decoder 510, including the buffer memory 515, and parser 520 may not be fully implemented in the local decoder 633 in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder 630 may perform motion compensated predictive coding, which codes an input picture predictively with reference to one or more previously coded picture from the video sequence that were designated as "reference pictures." In this manner, the coding engine 632 codes differences (or residue) in the color channels between pixel blocks of an input picture and pixel blocks of reference picture(s) that may be selected as prediction reference(s) to the input picture. The term "residue" and its adjective form "residual" may be used interchangeably.

The local video decoder 633 may decode coded video data of pictures that may be designated as reference pictures, based on symbols created by the source coder 630. Operations of the coding engine 632 may advantageously be lossy processes. When the coded video data may be decoded at a video decoder (not shown in FIG. 6), the reconstructed video sequence typically may be a replica of the source video sequence with some errors. The local video decoder 633 replicates decoding processes that may be performed by the video decoder on reference pictures and may cause reconstructed reference pictures to be stored in the reference picture cache 634. In this manner, the video encoder 603 may store copies of reconstructed reference pictures locally that have common content as the reconstructed reference pictures that will be obtained by a far-end (remote) video decoder (absent transmission errors).

The predictor 635 may perform prediction searches for the coding engine 632. That is, for a new picture to be coded, the predictor 635 may search the reference picture memory 634 for sample data (as candidate reference pixel blocks) or certain metadata such as reference picture motion vectors, block shapes, and so on, that may serve as an appropriate prediction reference for the new pictures. The predictor 635 may operate on a sample block-by-pixel block basis to find appropriate prediction references. In some cases, as determined by search results obtained by the predictor 635, an input picture may have prediction references drawn from multiple reference pictures stored in the reference picture memory 634.

The controller 650 may manage coding operations of the source coder 630, including, for example, setting of parameters and subgroup parameters used for encoding the video data.

Output of all aforementioned functional units may be subjected to entropy coding in the entropy coder 645. The entropy coder 645 translates the symbols as generated by the various functional units into a coded video sequence, by lossless compression of the symbols according to technologies such as Huffman coding, variable length coding, arithmetic coding, and so forth.

The transmitter 640 may buffer the coded video sequence(s) as created by the entropy coder 645 to prepare for transmission via a communication channel 660, which may be a hardware/software link to a storage device which would store the encoded video data. The transmitter 640 may merge coded video data from the video coder 603 with other data to be transmitted, for example, coded audio data and/or ancillary data streams (sources not shown).

The controller 650 may manage operation of the video encoder 603. During coding, the controller 650 may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder 603 may perform coding operations according to a predetermined video coding technology or standard, such as ITU-T Rec. H.265. In its operation, the video encoder 603 may perform various compression operations, including predictive coding operations that exploit temporal and spatial redundancies in the input video sequence. The coded video data may accordingly conform to a syntax specified by the video coding technology or standard being used.

In some example embodiments, the transmitter 640 may transmit additional data with the encoded video. The source coder 630 may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
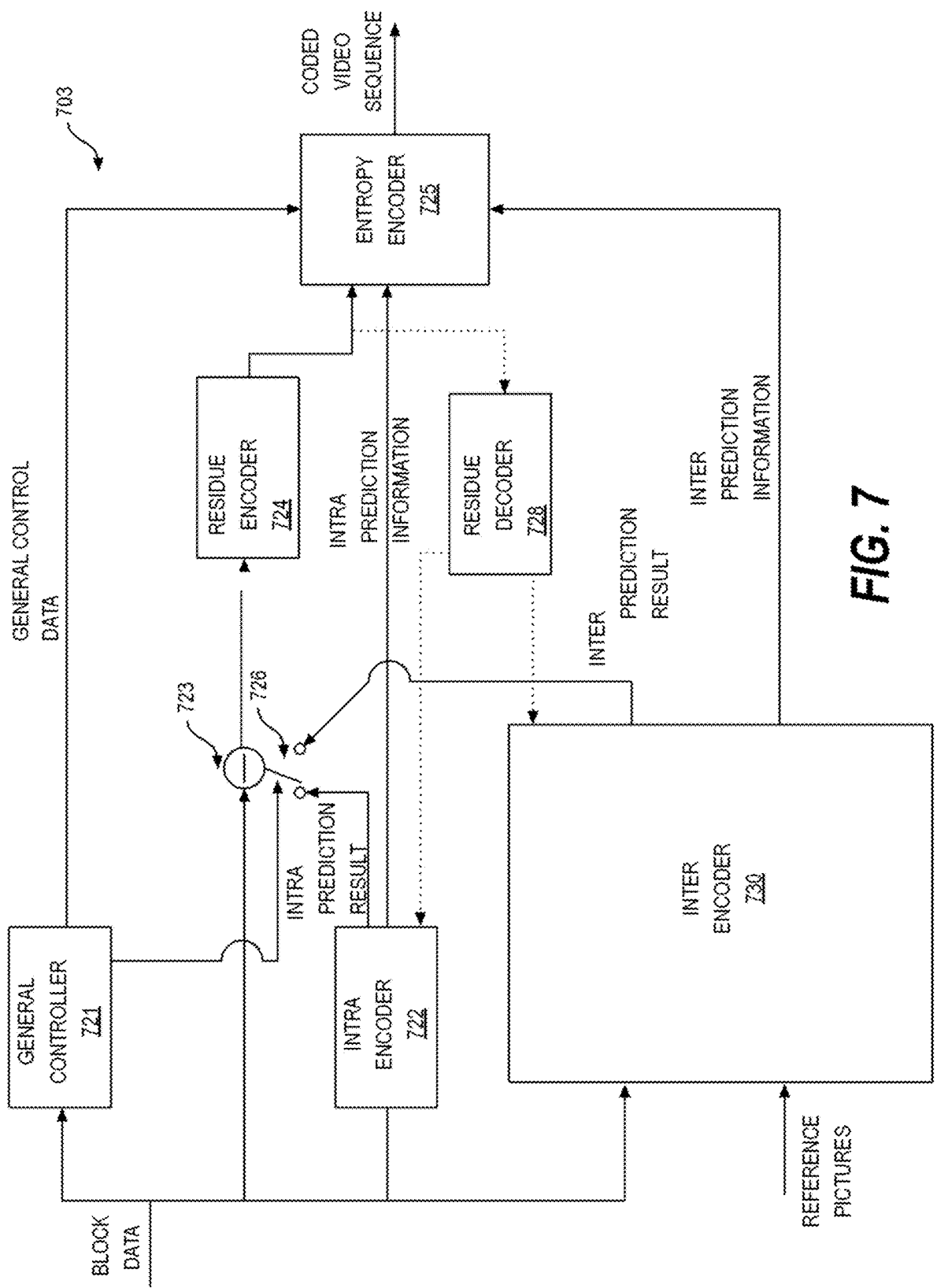
FIG. 7 shows a block diagram of a video encoder in accordance with another example embodiment.

FIG. 7 shows a diagram of a video encoder 703 according to another example embodiment of the disclosure. The video encoder 703 is configured to receive a processing block (e.g., a prediction block) of sample values within a current video picture in a sequence of video pictures, and encode the processing block into a coded picture that is part of a coded video sequence. The example video encoder 703 may be used in place of the video encoder (403) in the FIG. 4 example.

For example, the video encoder 703 receives a matrix of sample values for a processing block, such as a prediction block of 8×8 samples, and the like. The video encoder 703 then determines whether the processing block is best coded using intra mode, inter mode, or bi-prediction mode using, for example, rate-distortion optimization (RDO). When the processing block is determined to be coded in intra mode, the video encoder 703 may use an intra prediction technique to encode the processing block into the coded picture; and when the processing block is determined to be coded in inter mode or bi-prediction mode, the video encoder 703 may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder 703 may include components not explicitly shown in FIG. 7, such as a mode decision module, to determine the perdition mode of the processing blocks.

In the example of FIG. 7, the video encoder 703 includes an inter encoder 730, an intra encoder 722, a residue calculator 723, a switch 726, a residue encoder 724, a general controller 721, and an entropy encoder 725 coupled together as shown in the example arrangement in FIG. 7.

The inter encoder 730 is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder 722 is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder 722 may calculates intra prediction results (e.g., predicted block) based on the intra prediction information and reference blocks in the same picture.

The general controller 721 may be configured to determine general control data and control other components of the video encoder 703 based on the general control data. In an example, the general controller 721 determines the prediction mode of the block, and provides a control signal to the switch 726 based on the prediction mode. For example, when the prediction mode is the intra mode, the general controller 721 controls the switch 726 to select the intra mode result for use by the residue calculator 723, and controls the entropy encoder 725 to select the intra prediction information and include the intra prediction information in the bitstream; and when the predication mode for the block is the inter mode, the general controller 721 controls the switch 726 to select the inter prediction result for use by the residue calculator 723, and controls the entropy encoder 725 to select the inter prediction information and include the inter prediction information in the bitstream.

The residue calculator 723 may be configured to calculate a difference (residue data) between the received block and prediction results for the block selected from the intra encoder 722 or the inter encoder 730. The residue encoder 724 may be configured to encode the residue data to generate transform coefficients. For example, the residue encoder 724 may be configured to convert the residue data from a spatial domain to a frequency domain to generate the transform coefficients. The transform coefficients are then subject to quantization processing to obtain quantized transform coefficients. In various example embodiments, the video encoder 703 also includes a residual decoder 728. The residual decoder 728 is configured to perform inverse-transform, and generate the decoded residue data. The decoded residue data can be suitably used by the intra encoder 722 and the inter encoder 730. For example, the inter encoder 730 can generate decoded blocks based on the decoded residue data and inter prediction information, and the intra encoder 722 can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder 725 may be configured to format the bitstream to include the encoded block and perform entropy coding. The entropy encoder 725 is configured to include in the bitstream various information. For example, the entropy encoder 725 may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
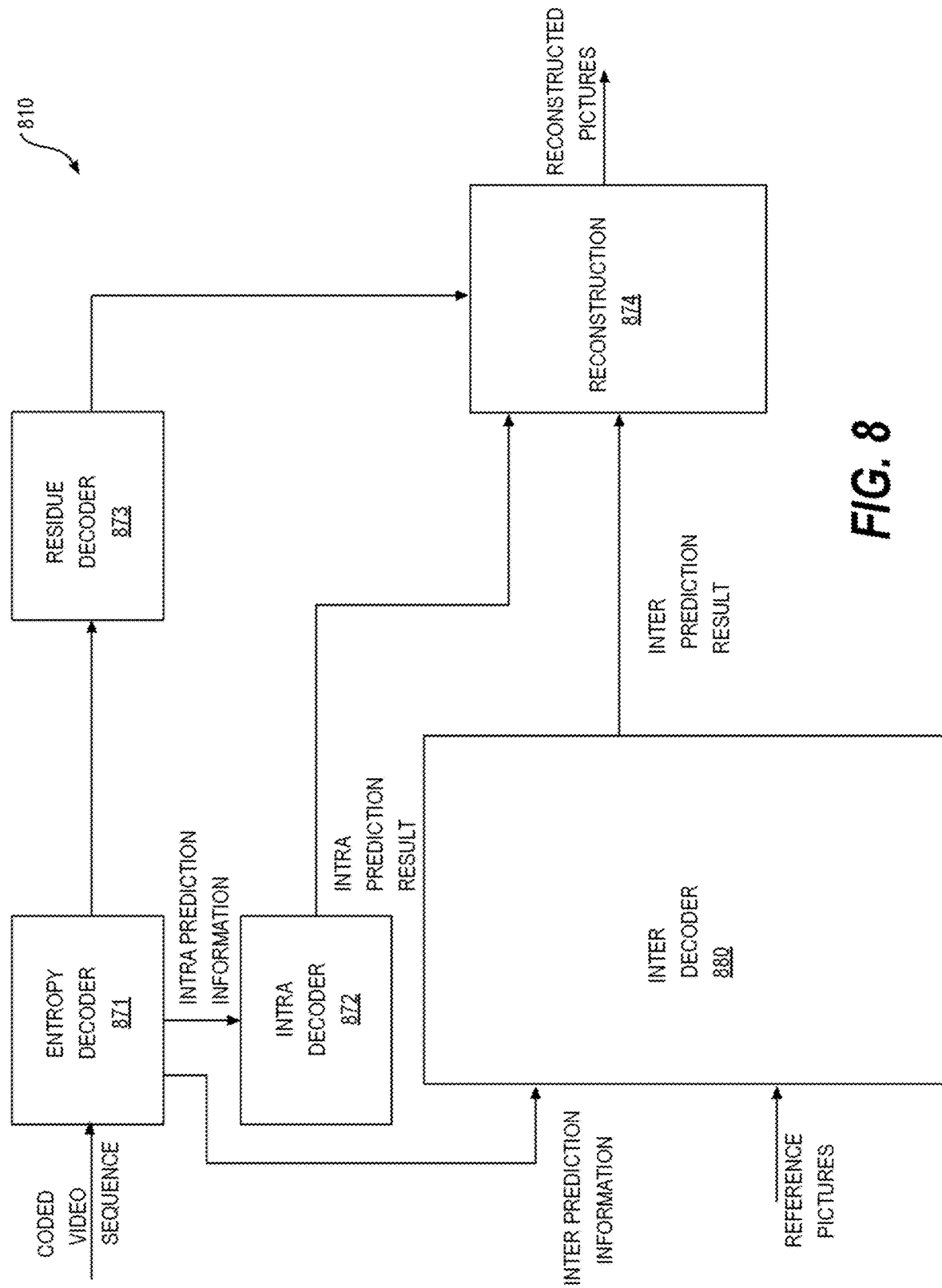
FIG. 8 shows a block diagram of a video decoder in accordance with another example embodiment.

FIG. 8 shows a diagram of an example video decoder 810 according to another embodiment of the disclosure. The video decoder 810 is configured to receive coded pictures that are part of a coded video sequence, and decode the coded pictures to generate reconstructed pictures. In an example, the video decoder 810 may be used in place of the video decoder 410 in the example of FIG. 4.

In the example of FIG. 8, the video decoder 810 includes an entropy decoder 871, an inter decoder 880, a residual decoder 873, a reconstruction module 874, and an intra decoder 872 coupled together as shown in the example arrangement of FIG. 8.

The entropy decoder 871 can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder 872 or the inter decoder 880, residual information in the form of, for example, quantized transform coefficients, and the like. In an example, when the prediction mode is the inter or bi-predicted mode, the inter prediction information is provided to the inter decoder 880; and when the prediction type is the intra prediction type, the intra prediction information is provided to the intra decoder 872. The residual information can be subject to inverse quantization and is provided to the residual decoder 873.

The inter decoder 880 may be configured to receive the inter prediction information, and generate inter prediction results based on the inter prediction information.

The intra decoder 872 may be configured to receive the intra prediction information, and generate prediction results based on the intra prediction information.

The residual decoder 873 may be configured to perform inverse quantization to extract de-quantized transform coefficients, and process the de-quantized transform coefficients to convert the residual from the frequency domain to the spatial domain. The residual decoder 873 may also utilize certain control information (to include the Quantizer Parameter (QP)) which may be provided by the entropy decoder 871 (data path not depicted as this may be low data volume control information only).

The reconstruction module 874 may be configured to combine, in the spatial domain, the residual as output by the residual decoder 873 and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders 403, 603, and 703, and the video decoders 410, 510, and 810 can be implemented using any suitable technique. In some example embodiments, the video encoders 403, 603, and 703, and the video decoders 410, 510, and 810 can be implemented using one or more integrated circuits. In another embodiment, the video encoders 403, 603, and 603, and the video decoders 410, 510, and 810 can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT).

The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, for an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 9:
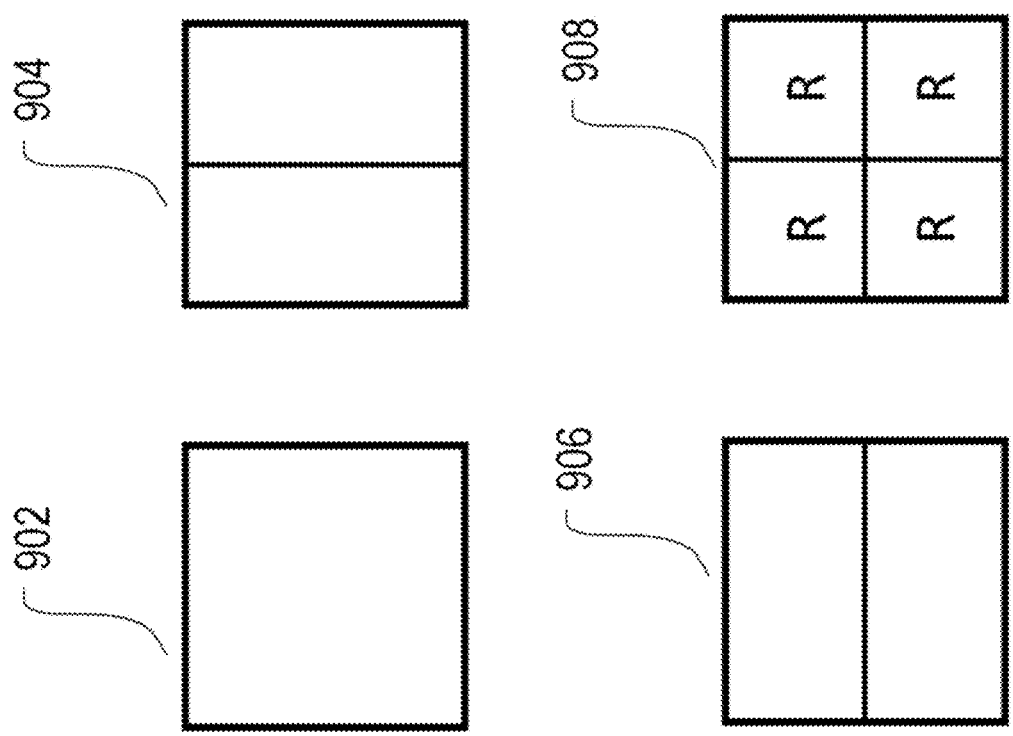
FIG. 9 shows a scheme of coding block partitioning according to example embodiments of the disclosure.

In some example implementations, a predetermined partitioning pattern may be applied to a base block. As shown in FIG. 9, an example 4-way partition tree may start from a first predefined level (e.g., 64×64 block level or other sizes, as a base block size) and a base block may be partitioned hierarchically down to a predefined lowest level (e.g., 4×4 level). For example, a base block may be subject to four predefined partitioning options or patterns indicated by 902, 904, 906, and 908, with the partitions designated as R being allowed for recursive partitioning in that the same partition options as indicated in FIG. 9 may be repeated at a lower scale until the lowest level (e.g., 4×4 level). In some implementations, additional restrictions may be applied to the partitioning scheme of FIG. 9. In the implementation of FIG. 9, rectangular partitions (e.g., 1:2/2:1 rectangular partitions) may be allowed but they may not be allowed to be recursive, whereas square partitions are allowed to be recursive. The partitioning following FIG. 9 with recursion, if needed, generates a final set of coding blocks. A coding tree depth may be further defined to indicate the splitting depth from the root node or root block. For example, the coding tree depth for the root node or root block, e.g. a 64×64 block, may be set to 0, and after the root block is further split once following FIG. 9, the coding tree depth is increased by 1. The maximum or deepest level from 64×64 base block to a minimum partition of 4×4 would be 4 (starting from level 0) for the scheme above. Such partitioning scheme may apply to one or more of the color channels. Each color channel may be partitioned independently following the scheme of FIG. 9 (e.g., partitioning pattern or option among the predefined patterns may be independently determined for each of the color channels at each hierarchical level). Alternatively, two or more of the color channels may share the same hierarchical pattern tree of FIG. 9 (e.g., the same partitioning pattern or option among the predefined patterns may be chosen for the two or more color channels at each hierarchical level).

Figure 10:
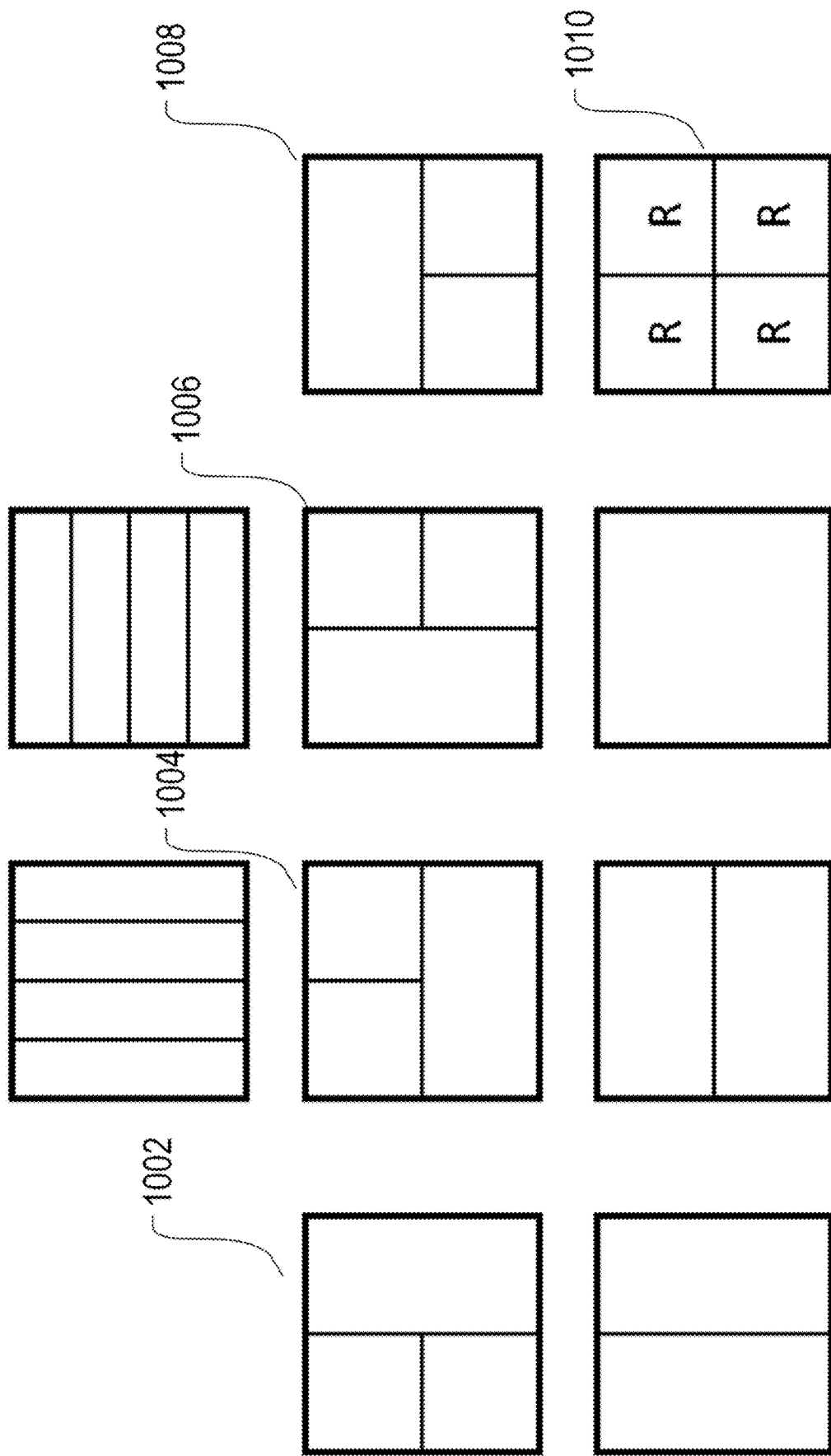
FIG. 10 shows another scheme of coding block partitioning according to example embodiments of the disclosure.

FIG. 10 shows another example predefined partitioning pattern allowing recursive partitioning to form a partitioning tree. As shown in FIG. 10, an example 10-way partitioning structure or pattern may be predefined. The root block may start at a predefined level (e.g. from a base block at 128×128 level, or 64×64 level). The example partitioning structure of FIG. 10 includes various 2:1/1:2 and 4:1/1:4 rectangular partitions. The partition types with 3 subpartitions indicated 1002, 1004, 1006, and 1008 in the second row of FIG. 10 may be referred to "T-type" partitions. The "T-Type" partitions 1002, 1004, 1006, and 1008 may be referred to as Left T-Type, Top T-Type, Right T-Type and Bottom T-Type. In some example implementations, none of the rectangular partitions of FIG. 10 is allowed to be further subdivided. A coding tree depth may be further defined to indicate the splitting depth from the root node or root block. For example, the coding tree depth for the root node or root block, e.g., a 128×128 block, may be set to 0, and after the root block is further split once following FIG. 10, the coding tree depth is increased by 1. In some implementations, only the all-square partitions in 1010 may be allowed for recursive partitioning into the next level of the partitioning tree following pattern of FIG. 10. In other words, recursive partitioning may not be allowed for the square partitions within the T-type patterns 1002, 1004, 1006, and 1008. The partitioning procedure following FIG. 10 with recursion, if needed, generates a final set of coding blocks. Such scheme may apply to one or more of the color channels. In some implementations, more flexibility may be added to the use of partitions below 8×8 level. For example, 2×2 chroma inter prediction may be used in certain cases.

In some other example implementations for coding block partitioning, a quadtree structure may be used for splitting a base block or an intermediate block into quadtree partitions. Such quadtree splitting may be applied hierarchically and recursively to any square shaped partitions. Whether a base block or an intermediate block or partition is further quadtree split may be adapted to various local characteristics of the base block or intermediate block/partition. Quadtree partitioning at picture boundaries may be further adapted. For example, implicit quadtree split may be performed at picture boundary so that a block will keep quadtree splitting until the size fits the picture boundary.

In some other example implementations, a hierarchical binary partitioning from a base block may be used. For such a scheme, the base block or an intermediate level block may be partitioned into two partitions. A binary partitioning may be either horizontal or vertical. For example, a horizontal binary partitioning may split a base block or intermediate block into equal right and left partitions. Likewise, a vertical binary partitioning may split a base block or intermediate block into equal upper and lower partitions. Such binary partitioning may be hierarchical and recursive. Decision may be made at each of the base block or intermediate block whether the binary partitioning scheme should continue, and if the scheme does continue further, whether a horizontal or vertical binary partitioning should be used. In some implementations, further partitioning may stop at a predefined lowest partition size (in either one or both dimensions). Alternatively, further partitioning may stop once a predefined partitioning level or depth from the base block is reached. In some implementations, the aspect ratio of a partition may be restricted. For example, the aspect ratio of a partition may not be smaller than 1:4 (or larger than 4:1). As such, a vertical strip partition with vertical to horizontal aspect ratio of 4:1, may only be further binary partitioned vertically into an upper and lower partitions each having a vertical to horizontal aspect ratio of 2:1.

Figure 13:
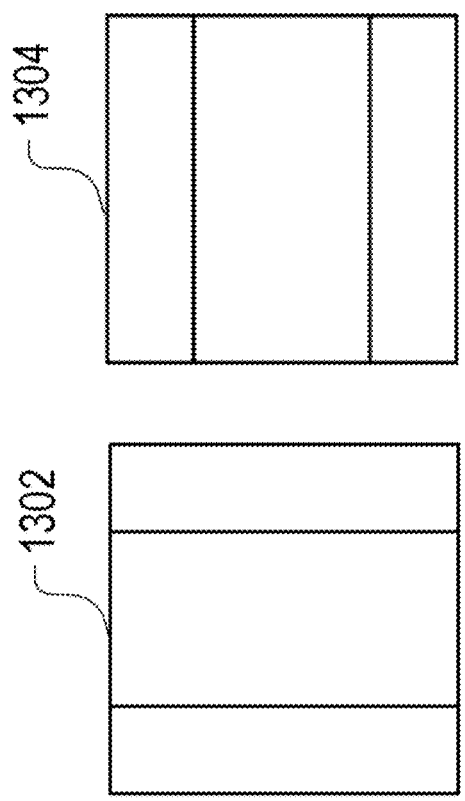
FIG. 13 shows an example ternary partitioning scheme.

In yet some other examples, a ternary partitioning scheme may be used for partitioning a base block or any intermediate block, as shown in FIG. 13. The ternary pattern may be implemented vertical, as shown in 1302 of FIG. 13, or horizontal, as shown in 1304 of FIG. 13. While the example split ratio in FIG. 13, either vertically or horizontally, is shown as 1:2:1, other ratios may be predefined. In some implementations, two or more different ratios may be predefined. Such ternary partitioning scheme may be used to complement the quadtree or binary partitioning structures in that such triple-tree partitioning is capable of capturing objects located in block center in one contiguous partition while quadtree and binary-tree are always splitting along block center and thus would split the object into separate partitions. In some implementations, the width and height of the partitions of the example triple trees are always power of 2 to avoid additional transforms.

Figure 14:
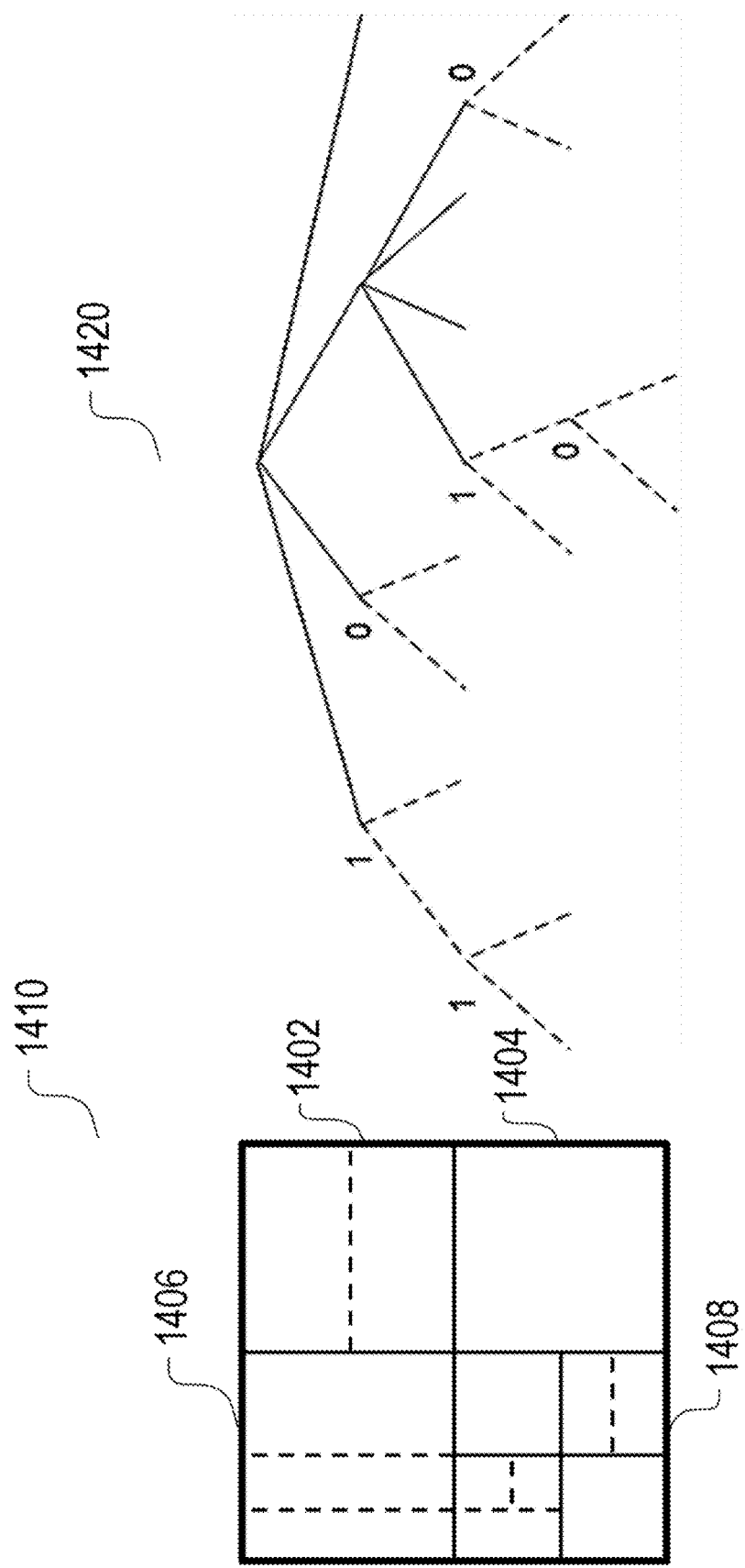
FIG. 14 shows an example quadtree binary tree coding block partitioning scheme.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 14. In the example of FIG. 14, a base block is first quadtree split into four partitions, as shown by 1402, 1404, 1406, and 1408. Thereafter, each of the resulting partitions is either quadtree partitioned into four further partitions (such as 1408), or binarily split into two further partitions (either horizontally or vertically, such as 1402 or 1406, both being symmetric, for example) at the next level, or non-split (such as 1404). Binary or quadtree splitting may be allowed recursively for square shaped partitions, as shown by the overall example partition pattern of 1410 and the corresponding tree structure/representation in 1420, in which the solid lines represent quadtree splitting, and the dashed lines represent binary splitting. Flags may be used for each binary splitting node (non-leaf binary partitions) to indicate whether the binary splitting is horizontal or vertical. For example, as shown in 1420, consistent with the partitioning structure of 1410, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:
  CTU size: the root node size of a quadtree (size of a base block)
  MinQTSize: the minimum allowed quadtree leaf node size
  MaxBTSize: the maximum allowed binary tree root node size
  MaxBTDepth: the maximum allowed binary tree depth
  MinBTSize: the minimum allowed binary tree leaf node size In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 14, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

In some other implementations, the QTBT scheme may be supplemented with ternary scheme described above. Such implementations may be referred to as multi-type-tree (MTT) structure. For example, in addition to binary splitting of a node, one of the ternary partition patterns of FIG. 13 may be chosen. In some implementations, only square nodes may be subject to ternary splitting. An additional flag may be used to indicate whether a ternary partitioning is horizontal or vertical.

The design of two-level or multi-level tree such as the QTBT implementations and QTBT implementations supplemented by ternary splitting may be mainly motivated by complexity reduction. Theoretically, the complexity of traversing a tree is $T^D$, where T denotes the number of split types, and D is the depth of tree. A tradeoff may be made by using multiple types (T) while reducing the depth (D).

In some implementations, a CB may be further partitioned. For example, a CB may be further partitioned into multiple prediction blocks (PBs) for purposes of intra or inter-frame prediction during coding and decoding processes. In other words, a CB may be further divided into different subpartitions, where individual prediction decision/configuration may be made. In parallel, a CB may be further partitioned into a plurality of transform blocks (TBs) for purposes of delineating levels at which transform or inverse transform of video data is performed. The partitioning scheme of a CB into PBs and TBs may or may not be the same. For example, each partitioning scheme may be performed using its own procedure based on, for example, the various characteristics of the video data. The PB and TB partitioning schemes may be independent in some example implementations. The PB and TB partitioning schemes and boundaries may be correlated in some other example implementations. In some implementations, for example, TBs may be partitioned after PB partitions, and in particular, each PB, after being determined following partitioning of a coding block, may then be further partitioned into one or more TBs. For example, in some implementations, a PB may be split into one, two, four, or other number of TBs.

In some implementations, for partitioning of a base block into coding blocks and further into prediction blocks and/or transform blocks, the luma channel and the chroma channels may be treated differently. For example, in some implementations, partitioning of a coding block into prediction blocks and/or transform blocks may be allowed for the luma channel, whereas such partitioning of a coding block into prediction blocks and/or transform blocks may not be allowed for the chroma channel(s). In such implementations, transform and/or prediction of luma blocks thus may be performed only at the coding block level. For another example, minimum transform block size for luma channel and chroma channel(s) may be different, e.g., coding blocks for luma channel may be allowed to be partitioned into smaller transform and/or prediction blocks than the chroma channels. For yet another example, the maximum depth of partitioning of a coding block into transform blocks and/or prediction blocks may be different between the luma channel and the chroma channels, e.g., coding blocks for luma channel may be allowed to be partitioned into deeper transform and/or prediction blocks than the chroma channel(s). For a specific example, luma coding blocks may be partitioned into transform blocks of multiple sizes that can be represented by a recursive partition going down by up to 2 levels, and transform block shapes such as square, 2:1/1:2, and 4:1/1:4 and transform block size from 4×4 to 64×64 may be allowed. For chroma blocks, however, only the largest possible transform blocks specified for the luma blocks may be allowed.

In some example implementations for partitioning of a coding block into PBs, the depth, the shape, and/or other characteristics of the PB partitioning may depend on whether the PB is intra or inter coded.

The partitioning of a coding block (or a prediction block) into transform blocks may be implemented in various example schemes, including but not limited to quadtree splitting and predefined pattern splitting, recursively or non-recursively, and with additional consideration for transform blocks at the boundary of the coding block or prediction block. In general, the resulting transform blocks may be at different split levels, may not be of the same size, and may not need to be square in shape (e.g., they can be rectangular with some allowed sizes and aspect ratios). Further examples are described in further detail below in relation to FIGS. 15, 16 and 17.

In some other implementations, however, the CBs obtained via any of the partitioning schemes above may be used as a basic or smallest coding block for prediction and/or transform. In other words, no further splitting is performed for perform inter-prediction/intra-prediction purposes and/or for transform purposes. For example, CBs obtained from the QTBT scheme above may be directly used as the units for performing predictions. Specifically, such a QTBT structure removes the concepts of multiple partition types, i.e. it removes the separation of the CU, PU and TU, and supports more flexibility for CU/CB partition shapes as described above. In such QTBT block structure, a CU/CB can have either a square or rectangular shape. The leaf nodes of such QTBT are used as units for prediction and transform processing without any further partitioning. This means that the CU, PU and TU have the same block size in such example QTBT coding block structure.

The various CB partitioning schemes above and the further partitioning of CBs into PBs and/or TBs (including no PB/TB partitioning) may be combined in any manner. The following particular implementations are provided as non-limiting examples.

A specific example implementation of coding block and transform block partitioning is described below. In such an example implementation, a base block may be split into coding blocks using recursive quadtree splitting, or a predefined splitting pattern described above (such as those in FIG. 9 and FIG. 10). At each level, whether further quadtree splitting of a particular partition should continue may be determined by local video data characteristics. The resulting CBs may be at various quadtree splitting levels, and of various sizes. The decision on whether to code a picture area using inter-picture (temporal) or intra-picture (spatial) prediction may be made at the CB level (or CU level, for all three-color channels). Each CB may be further split into one, two, four, or other number of PBs according to predefined PBsplitting type. Inside one PB, the same prediction process may be applied and the relevant information may be transmitted to the decoder on a PB basis. After obtaining the residual block by applying the prediction process based on the PBsplitting type, a CB can be partitioned into TBs according to another quadtree structure similar to the coding tree for the CB. In this particular implementation, a CB or a TB may but does not have to be limited to square shape. Further in this particular example, a PB may be square or rectangular shape for an inter-prediction and may only be square for intra-prediction. A coding block may be split into, e.g., four square-shaped TBs. Each TB may be further split recursively (using quadtree split) into smaller TBs, referred to as Residual Quadtree (RQT).

Figure 11:
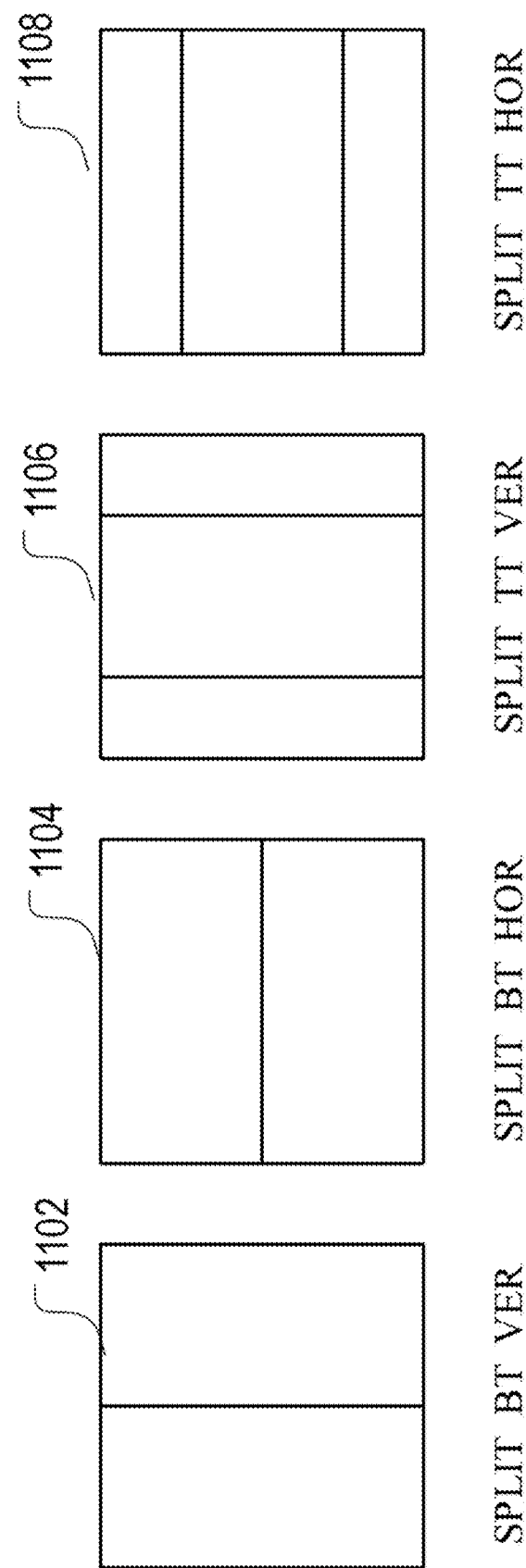
FIG. 11 shows another scheme of coding block partitioning according to example embodiments of the disclosure.

Another example implementation for partitioning of a base block into CBs, PBs and or TBs is further described below. For example, rather than using a multiple partition unit types such as those shown in FIG. 9 or FIG. 10, a quadtree with nested multi-type tree using binary and ternary splits segmentation structure (e.g., the QTBT or QTBT with ternary splitting as descried above) may be used. The separation of the CB, PB and TB (i.e., the partitioning of CB into PBs and/or TBs, and the partitioning of PBs into TBs) may be abandoned except when needed for CBs that have a size too large for the maximum transform length, where such CBs may need further splitting. This example partitioning scheme may be designed to support more flexibility for CB partition shapes so that the prediction and transform can both be performed on the CB level without further partitioning. In such a coding tree structure, a CB may have either a square or rectangular shape. Specifically, a coding tree block (CTB) may be first partitioned by a quadtree structure. Then the quadtree leaf nodes may be further partitioned by a nested multi-type tree structure. An example of the nested multi-type tree structure using binary or ternary splitting is shown in FIG. 11. Specifically, the example multi-type tree structure of FIG. 11 includes four splitting types, referred to as vertical binary splitting (SPLIT_BT_VER) 1102, horizontal binary splitting (SPLIT_BT_HOR) 1104, vertical ternary splitting (SPLIT_TT_VER) 1106, and horizontal ternary splitting (SPLIT_TT_HOR) 1108. The CBs then correspond to leaves of the multi-type tree. In this example implementation, unless the CB is too large for the maximum transform length, this segmentation is used for both prediction and transform processing without any further partitioning. This means that, in most cases, the CB, PB and TB have the same block size in the quadtree with nested multi-type tree coding block structure. The exception occurs when maximum supported transform length is smaller than the width or height of the colour component of the CB. In some implementations, in addition to the binary or ternary splitting, the nested patterns of FIG. 11 may further include quadtree splitting.

Figure 12:
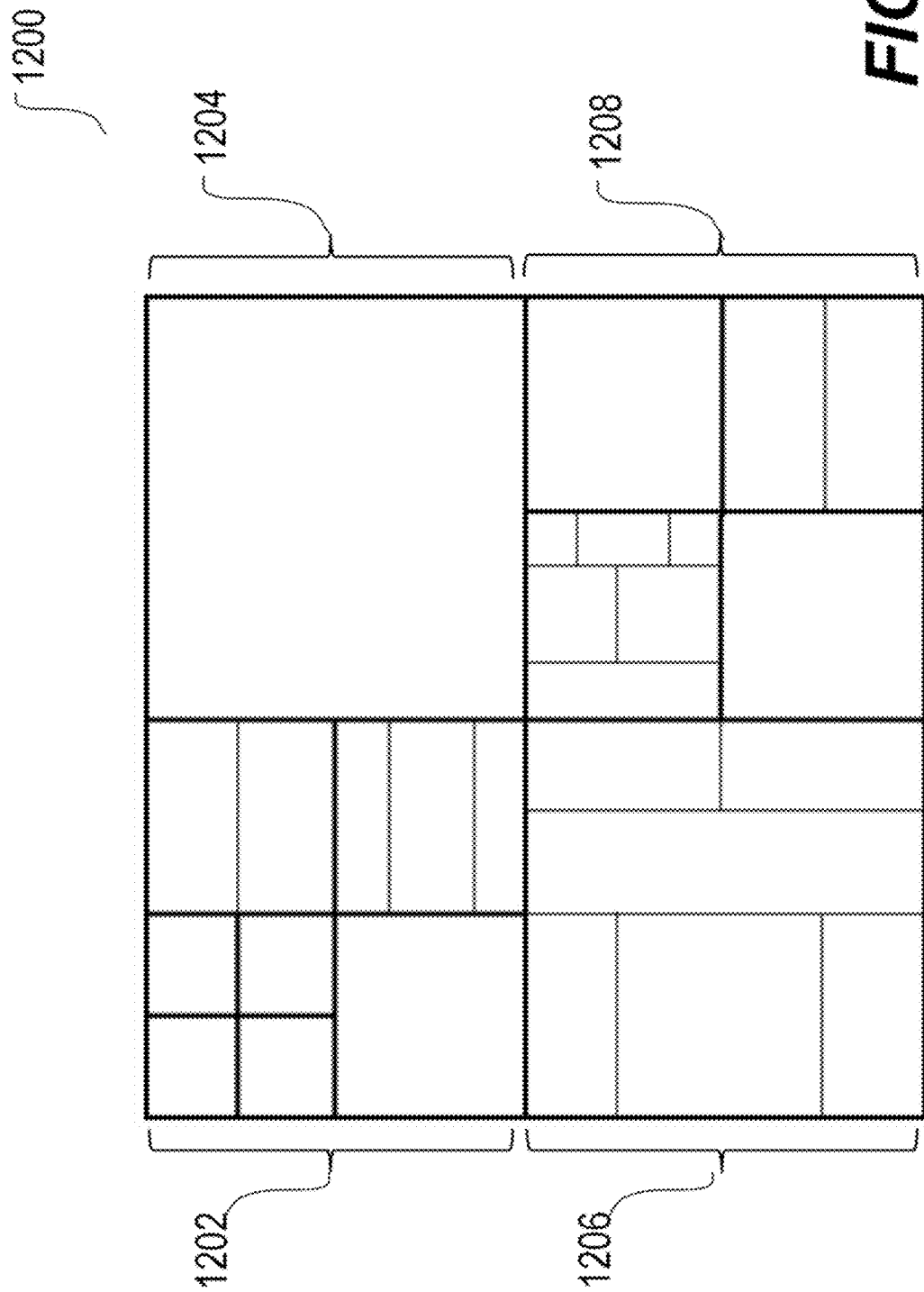
FIG. 12 shows an example partitioning of a base block into coding blocks according to an example partitioning scheme.

One specific example for the quadtree with nested multi-type tree coding block structure of block partition (including quadtree, binary, and ternary splitting options) for one base block is shown in FIG. 12. In more detail, FIG. 12 shows that the base block 1200 is quadtree split into four square partitions 1202, 1204, 1206, and 1208. Decision to further use the multi-type tree structure of FIG. 11 and quadtree for further splitting is made for each of the quadtree-split partitions. In the example of FIG. 12, partition 1204 is not further split. Partitions 1202 and 1208 each adopt another quadtree split. For partition 1202, the second level quadtree-split top-left, top-right, bottom-left, and bottom-right partitions adopts third level splitting of quadtree, horizontal binary splitting 1104 of FIG. 11, non-splitting, and horizontal ternary splitting 1108 of FIG. 11, respectively. Partition 1208 adopts another quadtree split, and the second level quadtree-split top-left, top-right, bottom-left, and bottom-right partitions adopts third level splitting of vertical ternary splitting 1106 of FIG. 11, non-splitting, non-splitting, and horizontal binary splitting 1104 of FIG. 11, respectively. Two of the subpartitions of the third-level top-left partition of 1208 are further split according to horizontal binary splitting 1104 and horizontal ternary splitting 1108 of FIG. 11, respectively. Partition 1206 adopts a second level split pattern following the vertical binary splitting 1102 of FIG. 11 into two partitions which are further split in a third-level according to horizontal ternary splitting 1108 and vertical binary splitting 1102 of the FIG. 11. A fourth level splitting is further applied to one of them according to horizontal binary splitting 1104 of FIG. 11.

For the specific example above, the maximum luma transform size may be 64×64 and the maximum supported chroma transform size could be different from the luma at, e.g., 32×32. Even though the example CBs above in FIG. 12 are generally not further split into smaller PBs and/or TBs, when the width or height of the luma coding block or chroma coding block is larger than the maximum transform width or height, the luma coding block or chroma coding block may be automatically split in the horizontal and/or vertical direction to meet the transform size restriction in that direction.

In the specific example for partitioning of a base block into CBs above, and as described above, the coding tree scheme may support the ability for the luma and chroma to have a separate block tree structure. For example, for P and B slices, the luma and chroma CTBs in one CTU may share the same coding tree structure. For I slices, for example, the luma and chroma may have separate coding block tree structures. When separate block tree structures are applied, luma CTB may be partitioned into luma CBs by one coding tree structure, and the chroma CTBs are partitioned into chroma CBs by another coding tree structure. This means that a CU in an I slice may consist of a coding block of the luma component or coding blocks of two chroma components, and a CU in a P or B slice always consists of coding blocks of all three colour components unless the video is monochrome.

When a coding block is further partitioned into multiple transform blocks, the transform blocks therein may be order in the bitstream following various order or scanning manners. Example implementations for partitioning a coding block or prediction block into transform blocks, and a coding order of the transform blocks are described in further detail below. In some example implementations, as described above, a transform partitioning may support transform blocks of multiple shapes, e.g., 1:1 (square), 1:2/2:1, and 1:4/4:1, with transform block sizes ranging from, e.g., 4×4 to 64×64. In some implementations, if the coding block is smaller than or equal to 64×64, the transform block partitioning may only apply to luma component, such that for chroma blocks, the transform block size is identical to the coding block size. Otherwise, if the coding block width or height is greater than 64, then both the luma and chroma coding blocks may be implicitly split into multiples of min (W, 64)×min (H, 64) and min (W, 32)×min (H, 32) transform blocks, respectively.

In some example implementations of transform block partitioning, for both intra and inter coded blocks, a coding block may be further partitioned into multiple transform blocks with a partitioning depth up to a predefined number of levels (e.g., 2 levels). The transform block partitioning depth and sizes may be related. For some example implementations, a mapping from the transform size of the current depth to the transform size of the next depth is shown in the following in Table 1.

TABLE 1

| Transform partition size setting | |
|---|---|
| Transform Size of Current Depth | Transform Size of Next Depth |
| TX_4 × 4 | TX_4 × 4 |
| TX_8 × 8 | TX_4 × 4 |
| TX_16 × 16 | TX_8 × 8 |
| TX_32 × 32 | TX_16 × 16 |
| TX_64 × 64 | TX_32 × 32 |
| TX_4 × 8 | TX_4 × 4 |
| TX_8 × 4 | TX_4 × 4 |
| TX_8 × 16 | TX_8 × 8 |
| TX_16 × 8 | TX_8 × 8 |
| TX_16 × 32 | TX_16 × 16 |
| TX_32 × 16 | TX_16 × 16 |
| TX_32 × 64 | TX_32 × 32 |
| TX_64 × 32 | TX_32 × 32 |
| TX_4 × 16 | TX_4 × 8 |
| TX_16 × 4 | TX_8 × 4 |
| TX_8 × 32 | TX_8 × 16 |
| TX_32 × 8 | TX_16 × 8 |
| TX_16 × 64 | TX_16 × 32 |
| TX_64 × 16 | TX_32 × 16 |

Based on the example mapping of Table 1, for 1:1 square block, the next level transform split may create four 1:1 square sub-transform blocks. Transform partition may stop, for example, at 4×4. As such, a transform size for a current depth of 4×4 corresponds to the same size of 4×4 for the next depth. In the example of Table 1, for 1:2/2:1 non-square block, the next level transform split may create two 1:1 square sub-transform blocks, whereas for 1:4/4:1 non-square block, the next level transform split may create two 1:2/2:1 sub transform blocks.

In some example implementations, for luma component of an intra coded block, additional restriction may be applied with respect to transform block partitioning. For example, for each level of transform partitioning, all the sub-transform blocks may be restricted to having equal size. For example, for a 32×16 coding block, level 1 transform split creates two 16×16 sub-transform blocks, level 2 transform split creates eight 8×8 sub-transform blocks. In other words, the second level splitting must be applied to all first level sub blocks to keep the transform units at equal sizes. An example of the transform block partitioning for intra coded square block following Table 1 is shown in FIG. 15, together with coding order illustrated by the arrows. Specifically, 1502 shows the square coding block. A first-level split into 4 equal sized transform blocks according to Table 1 is shown in 1504 with coding order indicated by the arrows. A second-level split of all of the first-level equal sized blocks into 16 equal sized transform blocks according to Table 1 is shown in 1506 with coding order indicated by the arrows.

In some example implementations, for luma component of inter coded block, the above restriction for intra coding may not be applied. For example, after the first level of transform splitting, any one of sub-transform block may be further split independently with one more level. The resulting transform blocks thus may or may not be of the same size. An example split of an inter coded block into transform locks with their coding order is show in FIG. 16. In the Example of FIG. 16, the inter coded block 1602 is split into transform blocks at two levels according to Table 1. At the first level, the inter coded block is split into four transform blocks of equal size. Then only one of the four transform blocks (not all of them) is further split into four sub-transform blocks, resulting in a total of 7 transform blocks having two different sizes, as shown by 1604. The example coding order of these 7 transform blocks is shown by the arrows in 1604 of FIG. 16.

In some example implementations, for chroma component(s), some additional restriction for transform blocks may apply. For example, for chroma component(s) the transform block size can be as large as the coding block size, but not smaller than a predefined size, e.g., 8×8.

In some other example implementations, for the coding block with either width (W) or height (H) being greater than 64, both the luma and chroma coding blocks may be implicitly split into multiples of min (W, 64)×min (H, 64) and min (W, 32)×min (H, 32) transform units, respectively. Here, in the present disclosure, a "min (a, b)" may return a smaller value between a and b.

Figure 17:
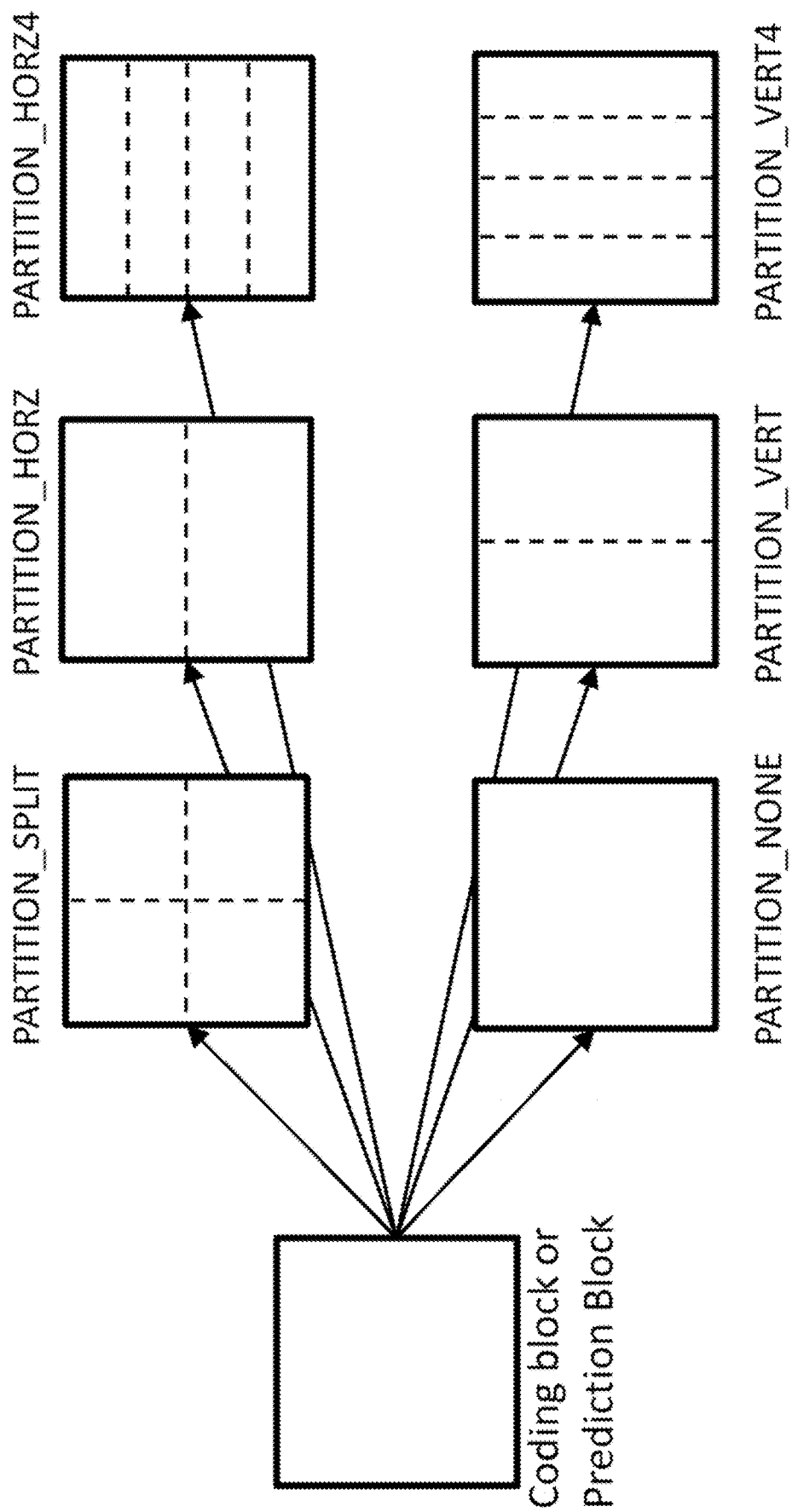
FIG. 17 shows another scheme for partitioning a coding block into multiple transform blocks according to example embodiments of the disclosure.

FIG. 17 further shows another alternative example scheme for partitioning a coding block or prediction block into transform blocks. As shown in FIG. 17, instead of using recursive transform partitioning, a predefined set of partitioning types may be applied to a coding block according to a transform type of the coding block. In the particular example shown in FIG. 17, one of the 6 example partitioning types may be applied to split a coding block into various number of transform blocks. Such scheme of generating transform block partitioning may be applied to either a coding block or a prediction block.

In more detail, the partitioning scheme of FIG. 17 provides up to 6 example partition types for any given transform type (transform type refers to the type of, e.g., primary transform, such as ADST and others). In this scheme, every coding block or prediction block may be assigned a transform partition type based on, for example, a rate-distortion cost. In an example, the transform partition type assigned to the coding block or prediction block may be determined based on the transform type of the coding block or prediction block. A particular transform partition type may correspond to a transform block split size and pattern, as shown by the 6 transform partition types illustrated in FIG. 17. A correspondence relationship between various transform types and the various transform partition types may be predefined. An example is shown below with the capitalized labels indicating the transform partition types that may be assigned to the coding block or prediction block based on rate distortion cost:

PARTITION_NONE: Assigns a transform size that is equal to the block size.
PARTITION_SPLIT: Assigns a transform size that is ½ the width of the block size and ½ the height of the block size.
PARTITION_HORZ: Assigns a transform size with the same width as the block size and ½ the height of the block size.
PARTITION_VERT: Assigns a transform size with ½ the width of the block size and the same height as the block size.
PARTITION_HORZ4: Assigns a transform size with the same width as the block size and ¼ the height of the block size.
PARTITION_VERT4: Assigns a transform size with ¼ the width of the block size and the same height as the block size.

In the example above, the transform partition types as shown in FIG. 17 all contain uniform transform sizes for the partitioned transform blocks. This is a mere example rather than a limitation. In some other implementations, mixed transform blocks sizes may be used for the partitioned transform blocks in a particular partition type (or pattern).

A video block (a PB or a CB, also referred to as PB when not being further partitioned into multiple prediction blocks) may be predicted in various manners rather than being directly encoded, thereby utilizing various correlations and redundancies in the video data to improve compression efficiency. Correspondingly, such prediction may be performed in various modes. For example, a video block may be predicted via intra-prediction or inter-prediction. Particularly in an inter-prediction mode, a video block may be predicted by one or more other reference blocks or inter-predictor blocks from one or more other frames via either single-reference or compound-reference inter-prediction. For implementation of inter-prediction, a reference block may be specified by its frame identifier (temporal location of the reference block) and a motion vector indicating a spatial offset between the current block being encoded or decoded and the reference block (spatial location of the reference block). The reference frame identification and the motion vectors may be signaled in the bitstream. The motion vectors as spatial block offsets may be signaled directly, or may be itself predicted by another reference motion vector or predictor motion vector. For example, the current motion vector may be predicted by a reference motion vector (of e.g., a candidate neighboring block) directly or by a combination of reference motion vector and a motion vector difference (MVD) between the current motion vector and the reference motion vector. The latter may be referred to as merge mode with motion vector difference (MMVD). The reference motion vector may be identified in the bitstream as a pointer to, for example, a spatially neighboring block or a temporarily neighboring but spatially collocated block of the current block.

Returning to the intra prediction process, in which samples in a block (e.g., a luma or chroma prediction block, or coding block if not further split into prediction blocks) is predicted by samples of neighboring, next neighboring, or other line or lines, or the combination thereof, to generate a prediction block. The residual between the actual block being coded and the prediction block may then be processed via transform followed by quantization. Various intra prediction modes may be made available and parameters related to intra mode selection and other parameters may be signaled in the bitstream. The various intra prediction modes, for example, may pertain to line position or positions for predicting samples, directions along which prediction samples are selected from predicting line or lines, and other special intra prediction modes.

Figure 1B:
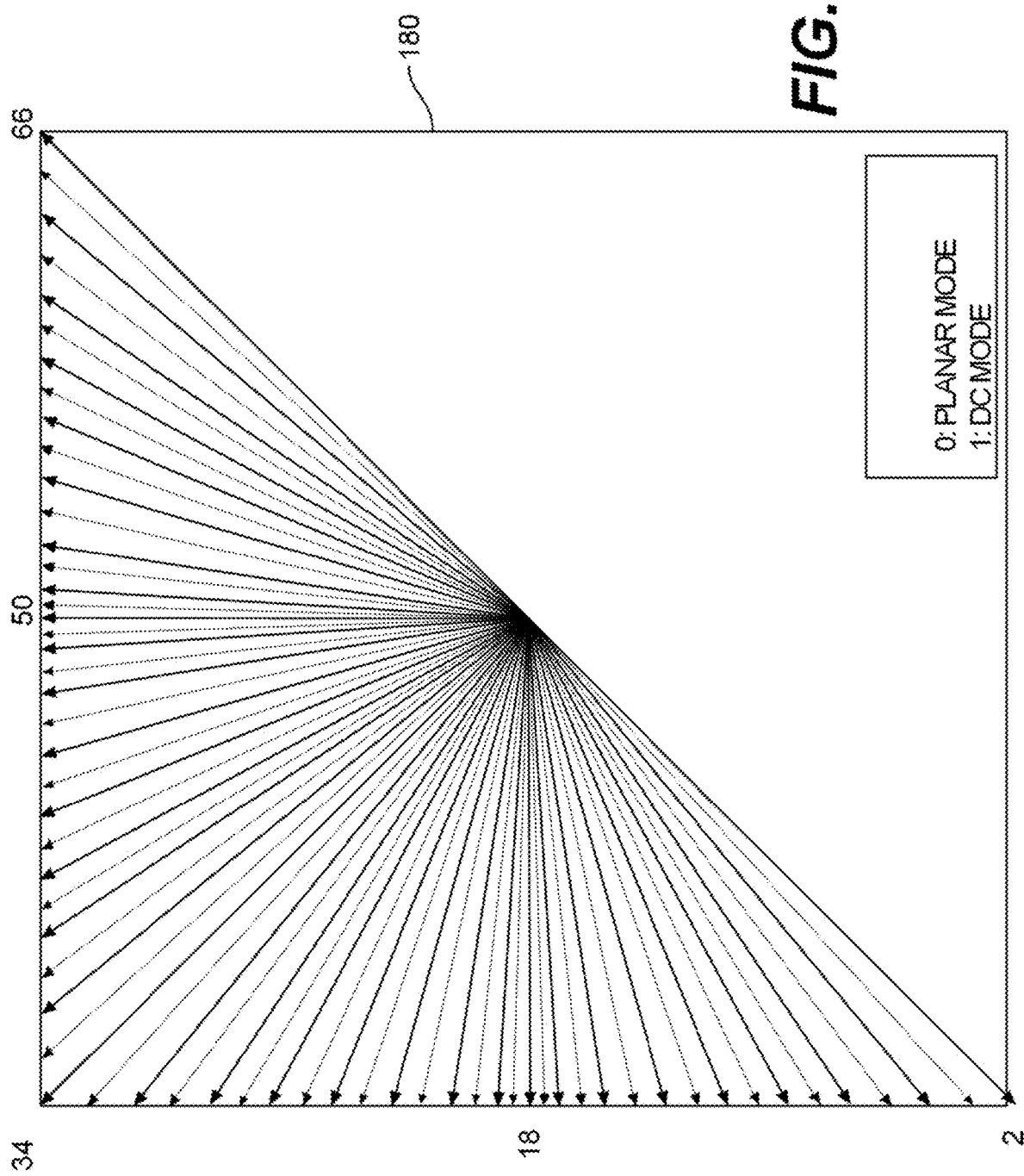
FIG. 1B shows an illustration of exemplary intra prediction directions.
Figure 2:
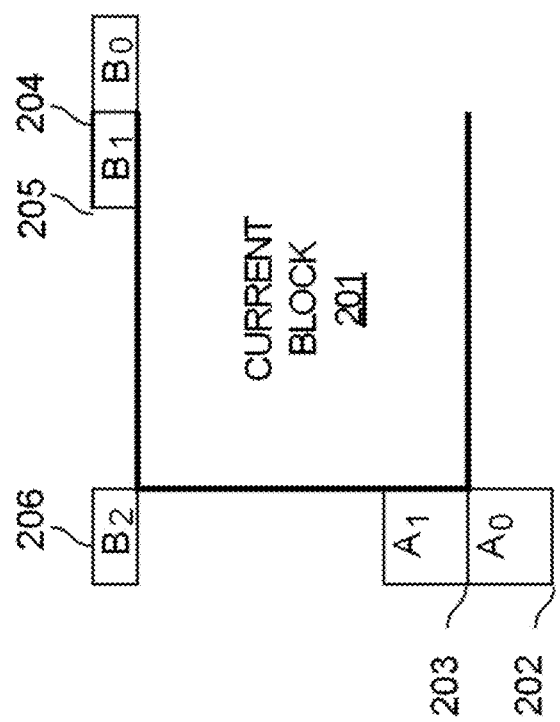
FIG. 2 shows a schematic illustration of a current block and its surrounding spatial merge candidates for motion vector prediction in one example.

For example, a set of intra prediction modes (interchangeably referred to as "intra modes") may include a predefined number of directional intra prediction modes. As described above in relation to the example implementation of FIG. 1, these intra prediction modes may correspond to a predefined number of directions along which out-of-block samples are selected as prediction for samples being predicted in a particular block. In another particular example implementation, eight (8) main directional modes corresponding to angles from 45 to 207 degrees to the horizontal axis may be supported and predefined.

Figure 18:
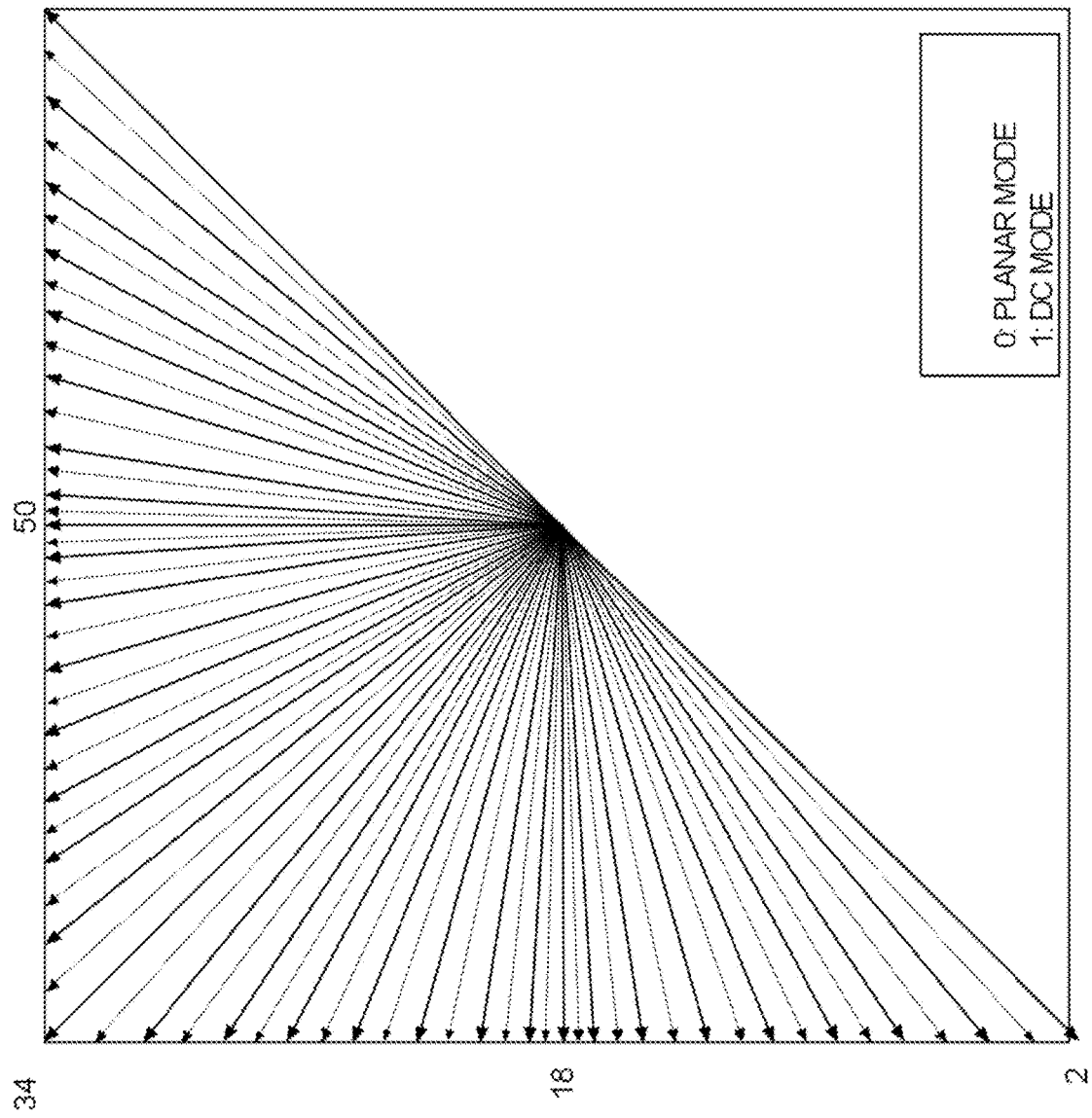
FIG. 18 shows example fine angles in direction intra-prediction.
Figure 19:
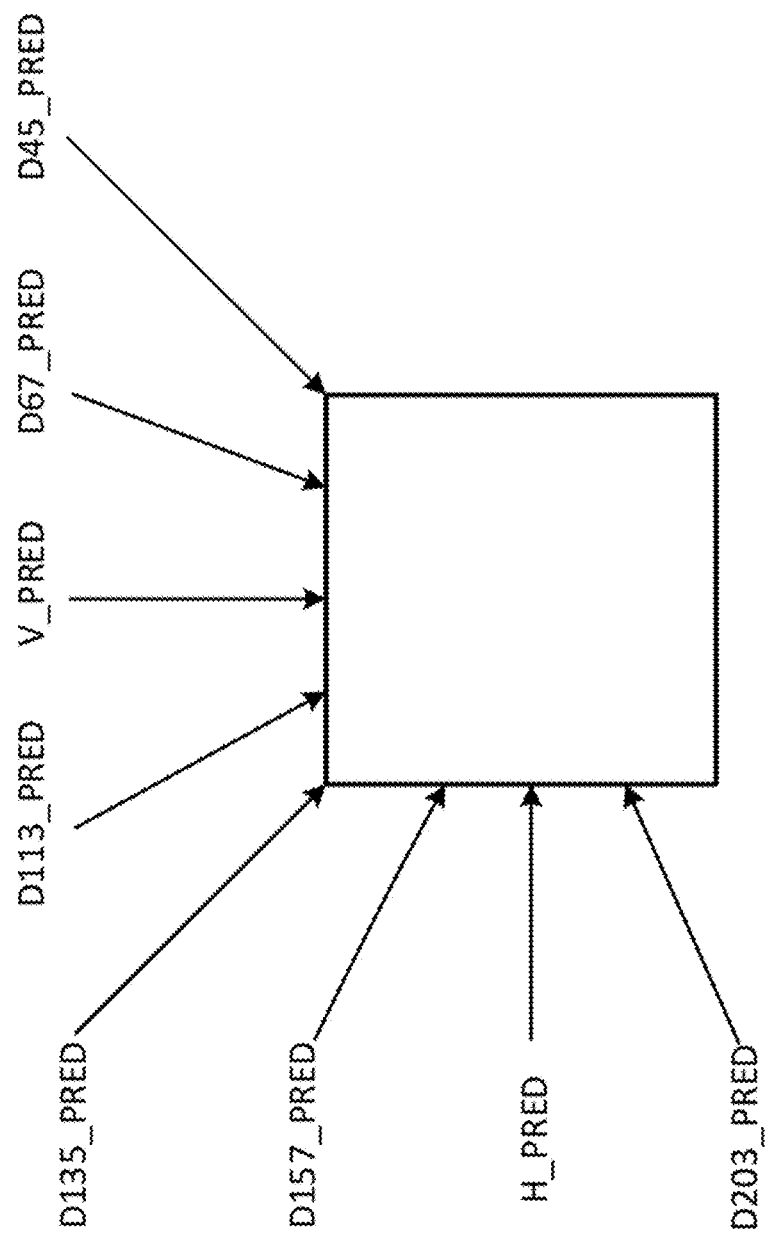
FIG. 19 shows nominal angles in directional intra-prediction.

In some other implementations of intra prediction, to further exploit more varieties of spatial redundancy in directional textures, directional intra modes may be further extended to an angle set with finer granularity. For example, the 8-angle implementation above may be configured to provide eight nominal angles, referred to as V_PRED, H_PRED, D45_PRED, D135_PRED, D113_PRED, D157_PRED, D203_PRED, and D67_PRED, as illustrated in FIG. 19, and for each nominal angle, a predefined number (e.g., 7) of finer angles may be added. With such an extension, a larger total number (e.g., 56 in this example) of directional angles may be available for intra prediction, corresponding to the same number of predefined directional intra modes. A prediction angle may be represented by a nominal intra angle plus an angle delta. For the particular example above with 7 finer angular directions for each nominal angle, the angle delta may be −3~3 multiplies a step size of 3 degrees. Some as angular scheme may be used, as shown in FIG. 18 with 65 different prediction angles.

Figure 20:
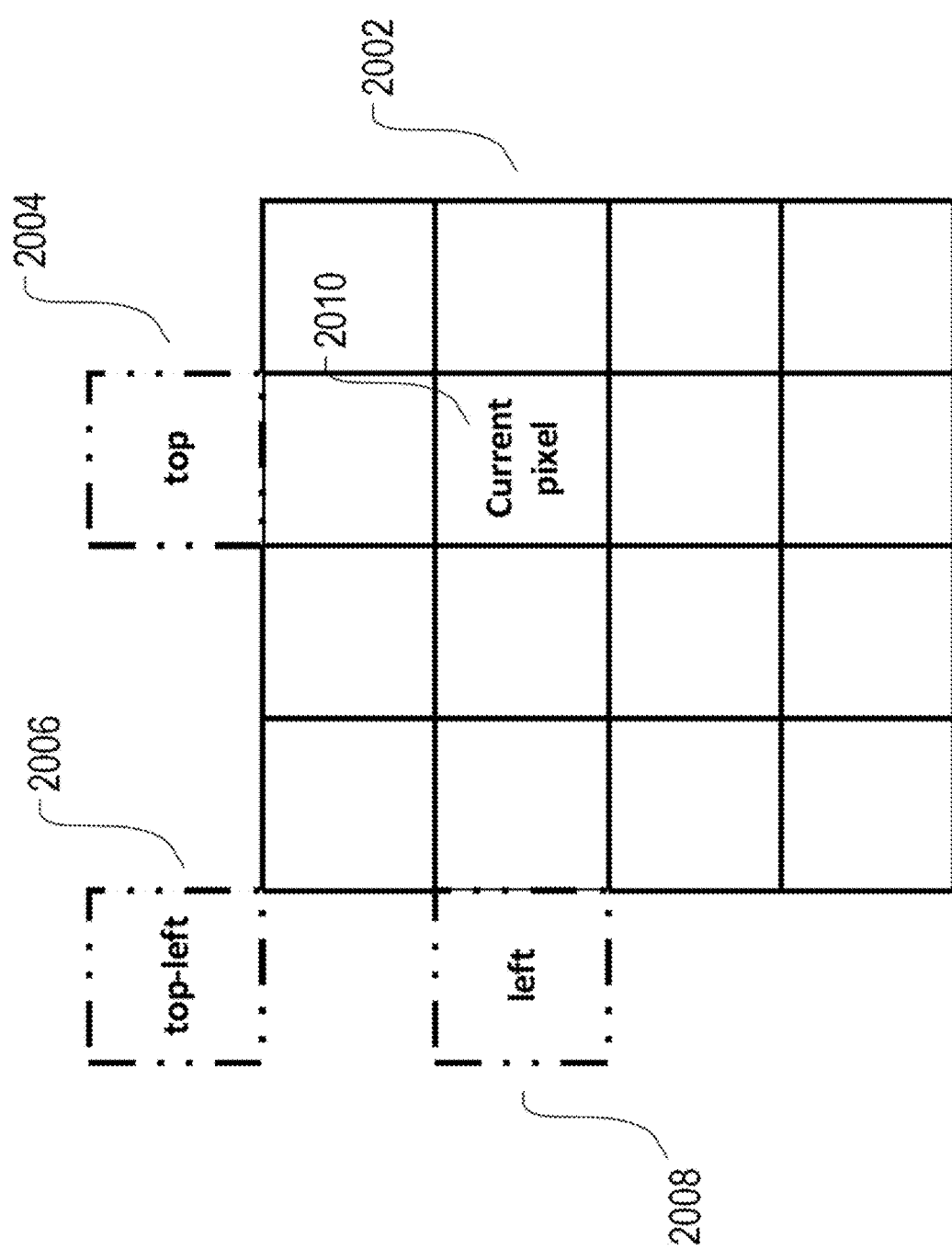
FIG. 20 shows top, left, and top-left position for PAETH mode for a block.

In some implementations, alternative or in addition to the direction intra modes above, a predefined number of non-directional intra prediction modes may also be predefined and made available. For example, 5 non-direction intra modes referred to as smooth intra prediction modes may be specified. These non-directional intra mode prediction modes may be specifically referred to as DC, PAETH, SMOOTH, SMOOTH_V, and SMOOTH_H intra modes. Prediction of samples of a particular block under these example non-directional modes are illustrated in FIG. 20. As an example, FIG. 20 shows a 4×4 block 2002 being predicted by samples from a top neighboring line and/or left neighboring line. A particular sample 2010 in block 2002 may correspond to directly top sample 2004 of the sample 2010 in the top neighboring line of block 2002, a top-left sample 2006 of the sample 2010 as the intersection of the top and left neighboring lines, and a directly left sample 2008 of the sample 2010 in the left neighboring line of block 2002. For the example DC intra prediction mode, an average of the left and above neighboring samples 2008 and 2004 may be used as the predictor of the sample 2010. For the example PAETH intra prediction mode, the top, left, and top-left reference samples 2004, 2008, and 2006 may be fetched, and then whichever value among these three reference samples that is the closest to (top+left−topleft) may be set as the predictor for the sample 2010. For the example SMOOTH_V intra prediction mode, the sample 2010 may be predicted by a quadratic interpolation in vertical direction of the top-left neighboring sample 2006 and the left neighboring sample 2008. For the example SMOOTH_H intra prediction mode, the sample 2010 may be predicted by a quadratic interpolation in horizontal direction of the top-left neighboring sample 2006 and the top neighboring sample 2004. For the example SMOOTH intra prediction mode, the sample 2010 may be predicted by an average of the quadratic interpolations in the vertical and the horizontal directions. The non-directional intra mode implementations above are merely illustrated as a non-limiting example. Other neighboring lines, and other non-directional selection of samples, and manners of combining predicting samples for predicting a particular sample in a prediction block are also contemplated.

Selection of a particular intra prediction mode by the encoder from the directional or non-directional modes above at various coding levels (picture, slice, block, unit, etc.) may be signaled in the bitstream. In some example implementations, the exemplary 8 nominal directional modes together with 5 non-angular smooth modes (a total of 13 options) may be signaled first. Then if the signaled mode is one of the 8 nominal angular intra modes, an index is further signaled to indicate the selected angle delta to the corresponding signaled nominal angle. In some other example implementations, all intra prediction modes may be indexed all together (e.g., 56 directional modes plus 5 non-directional modes to yield 61 intra prediction modes) for signaling.

In some example implementations, the example 56 or other number of directional intra prediction modes may be implemented with a unified directional predictor that projects each sample of a block to a reference sub-sample location and interpolates the reference sample by a 2-tap bilinear filter.

Figure 21:
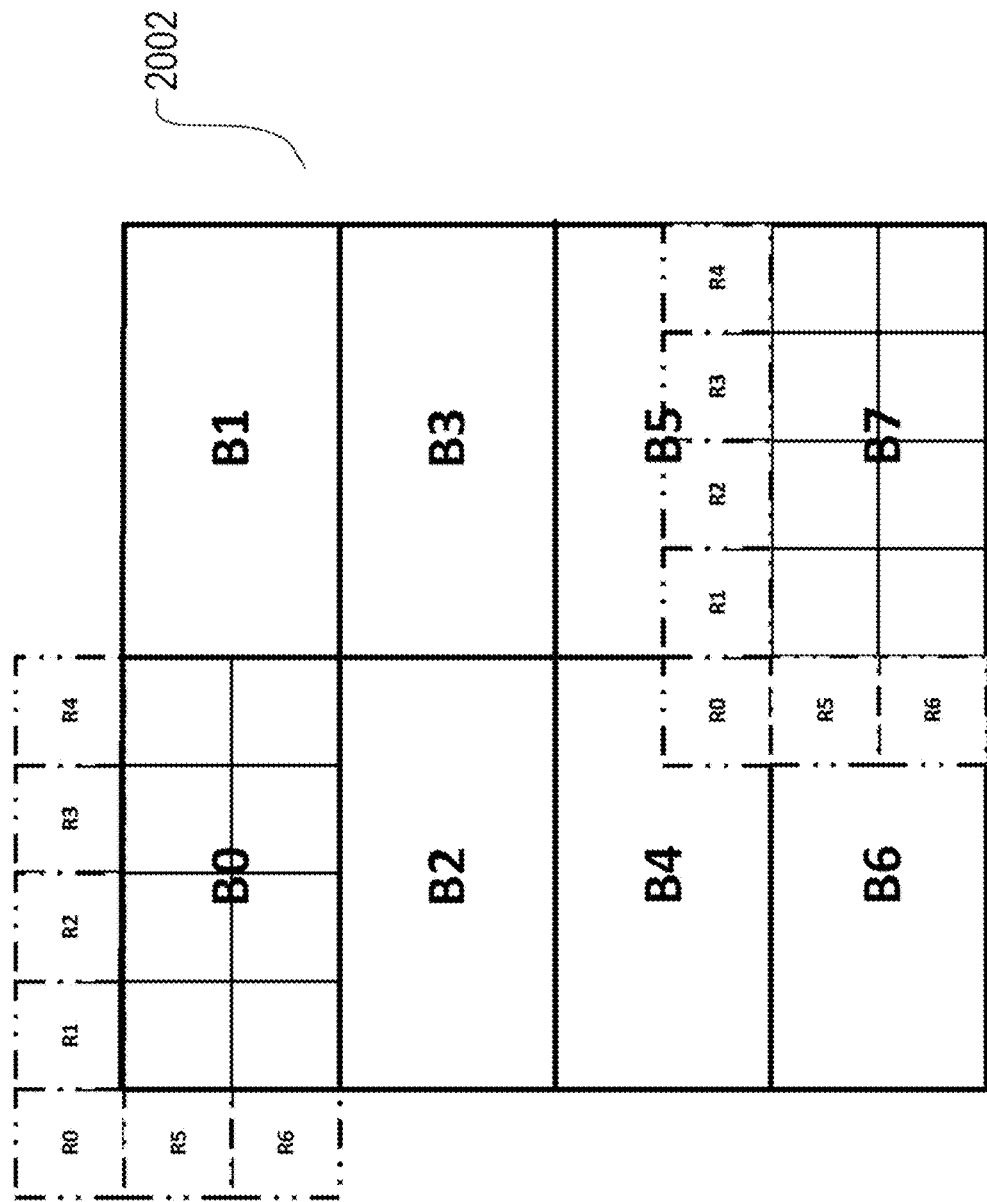
FIG. 21 shows example recursive intra filtering mode.

In some implementations, to capture decaying spatial correlation with references on the edges, additional filter modes referred to as FILTER INTRA modes may be designed. For these modes, predicted samples within the block in addition to out-of-block samples may be used as intra prediction reference samples for some patches within the block. These modes, for example, may be predefined and made available to intra prediction for at least luma blocks (or only luma blocks). A predefined number (e.g., five) of filter intra modes may be pre-designed, each represented by a set of n-tap filters (e.g., 7-tap filters) reflecting correlation between samples in, for example, a 4×2 patch and n neighbors adjacent to it. In other words, the weighting factors for an n-tap filter may be position dependent. Taking an 8×8 block, 4×2 patch, and 7-tap filtering as an example, as shown in FIG. 21, the 8×8 block 2002 may be split into eight 4×2 patches. These patches are indicated by B0, B1, B1, B3, B4, B5, B6, and B7 in FIG. 21. For each patch, its 7 neighbors, indicated by R0~R6 in FIG. 21, may be used to predict the samples in a current patch. For patch B0, all the neighbors may have been already reconstructed. But for other patches, some of the neighbors are in the current block and thus may not have been reconstructed, then the predicted values of immediate neighbors are used as the reference. For example, all the neighbors of patch B7 as indicated in FIG. 21 are not reconstructed, so the prediction samples of neighbors are used instead.

In some implementation of intra prediction, one color component may be predicted using one or more other color components. A color component may be any one of components in YCrCb, RGB, XYZ color space and the like.

One type of intra prediction that predicts one color component using one or more other color components is Chroma from Luma (CfL) prediction. In CfL prediction, a chroma component is predicted based on a luma component. The chroma component that is predicted may include a chroma block, which may include samples or chroma samples. The samples that are predicted are referred to as prediction samples. Also, the chroma block that is predicted may correspond to a luma block. Herein, unless specified otherwise, the correspondence between a luma block and a chroma block refers to chroma block being co-located with the luma block.

Also, as used herein and as described in further detail below, the luma component used to predict the chroma component may include luma samples. The luma samples may include luma samples of the corresponding or co-located chroma block itself, and/or may include neighbor luma samples, which are luma samples of one or more neighbor luma block that neighbor or are adjacent to the co-located luma block corresponding to the chroma block being predicted. Additionally, for at least some implementations, the luma samples used in a CfL prediction process are reconstructed luma samples, which may be copies of original luma samples derived or reconstructed from compressed versions of the original luma samples using a decoding process.

In some implementations, an encoder (e.g., any of the encoder 403, 603, 703) and/or a decoder (e.g., any of the decoder 410, 510, 810) may be configured to perform CfL prediction via a CfL prediction process. Also, in at least some of these implementations, the encoder and/or decoder may be configured in a CfL prediction mode to perform a CfL prediction process. As described in further detail below, the encoder and/or decoder may be operable in at least one of a plurality of different CfL prediction modes. In the different CfL prediction modes, the encoder and/or decoder may perform different respective CfL processes in order to generate the chroma prediction samples.

Figure 22A:
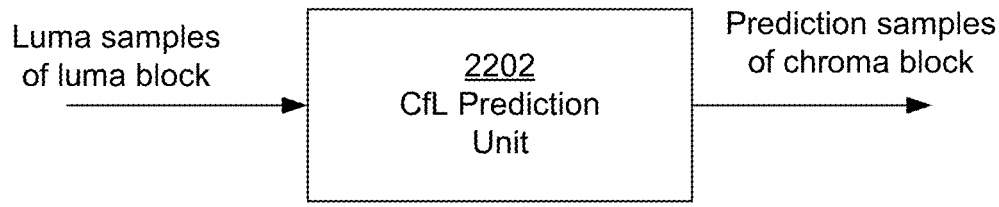
FIG. 22A shows a block diagram of a chroma from luma (CfL) prediction unit configured to generate prediction samples of a chroma block based on luma samples of a luma block.
Figure 22B:
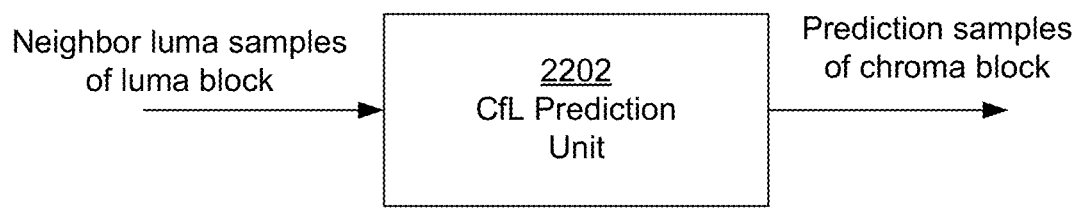
FIG. 22B shows a block diagram of a CfL prediction unit configured to generate prediction samples of a chroma block based on neighbor luma samples of a co-located luma block.
Figure 22C:
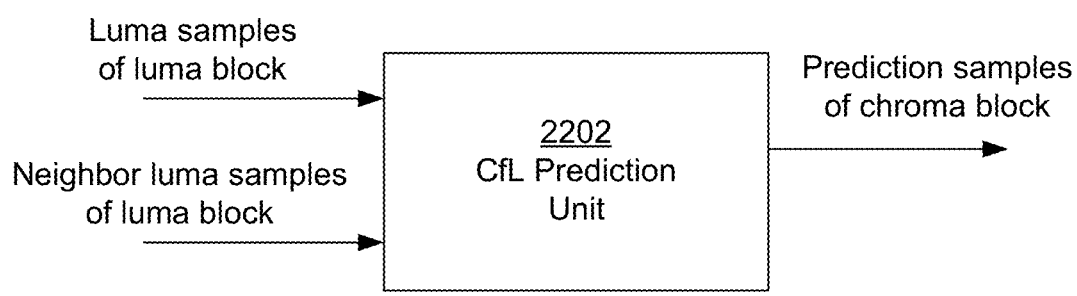
FIG. 22C shows a block diagram of a CfL prediction unit configured to generate prediction samples of a chroma block based on luma samples and neighbor luma samples of a co-located luma block.

Referring to FIGS. 22A-22C, an encoder and/or a decoder may include a CfL prediction unit 2202 configured to perform a CfL prediction process. In various implementations, the CfL prediction unit 2202 may be a standalone unit, or may be a component or sub-unit of another unit of the encoder or decoder. For example, in any of various implementations, the CfL prediction unit 2202 may be a component or sub-unit of the intra prediction unit 552, the intra encoder 722, or the intra decoder 872. Also, the CfL prediction unit 2202 may be configured to perform various or multiple operations or functions in order to perform or carry out a CfL process. For simplicity, the CfL prediction unit 2202 is described as being the component of the encoder and/or the decoder that performs each of these operations or functions. However, in any of various implementations, the CfL prediction unit 2202 may be further configured or organized into multiple sub-units, each configured to perform one or more of the operations or functions of a CfL prediction process, or one or more units separate from the CfL prediction unit 2202 may be configured to perform one or more operations of a CfL prediction process. Also, in any of various implementations, the CfL prediction unit 2202 may be implemented in hardware or a combination or hardware or software in order to perform and/or carry out the operations or functions of a CfL process. For example, the CfL prediction unit may be implemented as an integrated circuit, or a processor configured to executed software or firmware stored in memory, or combinations thereof. Also, in any of various implementations, a non-transitory computer readable storage medium may store computer instructions executable by a processor to perform the functions or operations of the CfL prediction unit 2202.

For CfL prediction, an encoder and/or a decoder, such as via the CfL prediction unit 2202, may determine that a CfL prediction mode is to be applied to a luma block in a received coded bitstream. In turn, the CfL prediction unit 2202 may perform CfL prediction on the luma block according to the CfL prediction mode determined to be applied.

Correspondingly, the encoder and/or decoder, such as via the CfL prediction unit 2202, may reconstruct a chroma block corresponding to or co-located with the luma block by, at least in part, application of the CfL prediction mode.

As mentioned, the CfL prediction unit 2202 may operate in at least one of multiple CfL prediction modes. Referring to FIG. 22A, in a first CfL prediction mode (or a first set of one or more CfL prediction modes), the CfL prediction unit 2202 may be configured to generate a plurality of prediction samples of a chroma block corresponding to a luma block based on luma samples of the luma block. As mentioned, a chroma block that corresponds to a luma block is a chroma block that is co-located with the luma block. Correspondingly, in FIG. 22A, in the first CfL prediction mode, the CfL prediction unit uses luma samples of the luma block that is co-located with the chroma block for which it is to generate prediction samples.

Figure 23:
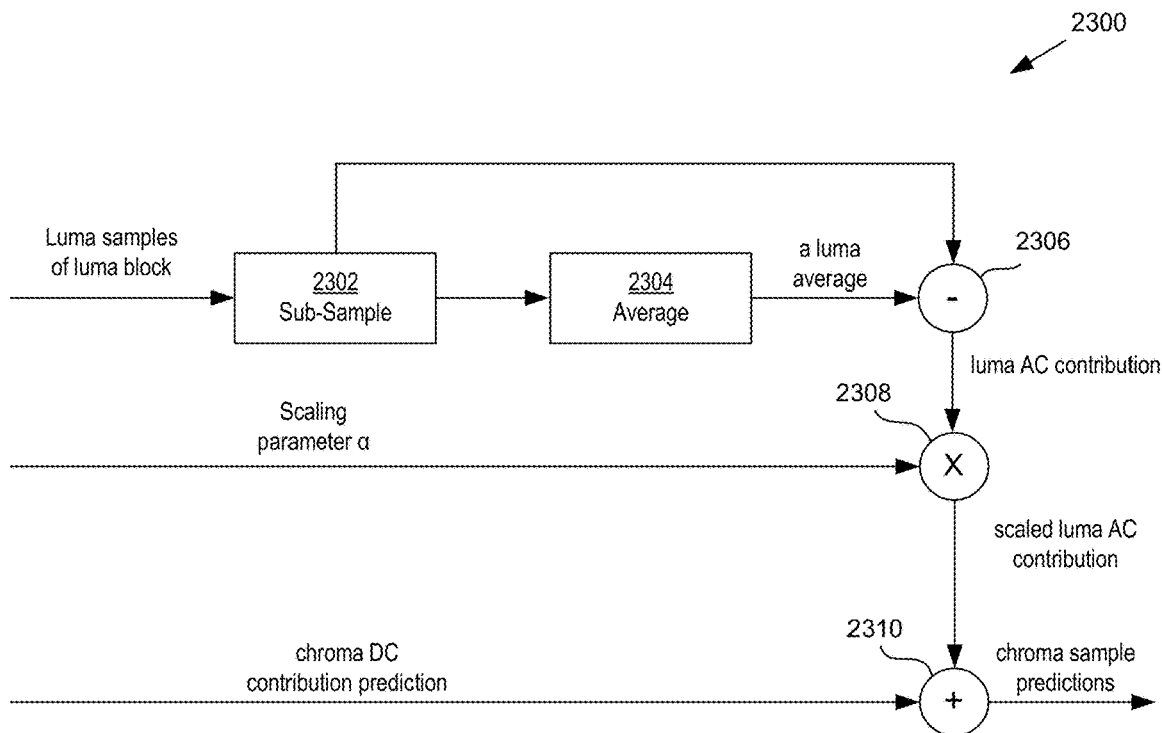
FIG. 23 shows a flow diagram of an example CfL prediction process.

FIG. 23 shows a flow diagram of an example method 2300 of a CfL prediction process that the CfL prediction unit 2202 may perform in the first CfL prediction mode. In some implementations, the CfL prediction process, such as the one shown in FIG. 23, generates a plurality of chroma prediction samples based on an alternating current (AC) contribution of luma samples and a direct current (DC) contribution of chroma samples. Each of the AC contribution and the DC contribution may be predictions of the chroma component, and in turn, also called AC contribution predictions and DC contribution predictions. In particular of these implementations, the chroma prediction samples is modeled as a linear function of luma samples, such as according to the following mathematical formula:

$$CfL(\alpha) = \alpha \times L^{AC} + DC \quad (1)$$

where $L^{AC}$ denotes an AC contribution of the luma component (luma samples), α denotes a scaling parameter of the linear model, and DC denotes a DC contribution of the chroma component. Also, for at least some implementations, the AC contribution is obtained for each of the samples of the block, whereas the DC contribution is obtained for the entire block.

In particular of these implementations as shown in FIG. 23, at block 2302, a plurality of luma samples of the luma block may be sub-sampled (or down-sampled) into a chroma resolution (e.g., 4:2:0, 4:2:2, or 4:4:4). At block 2304, the sub-sampled luma samples may be averaged to generate a luma average. At block 2306, the luma average may be subtracted from the luma samples to generate the AC contribution of the luma component. At block 2308, the AC contribution of the luma component may be multiplied by the scaling parameter a to generate a scaled AC contribution of the luma component. The scaled AC contribution of the luma component may also be an AC contribution prediction of the chroma component. At block 2310, the DC contribution prediction of the chroma component may be added to the AC contribution prediction to generate the chroma prediction samples, in accordance with the linear model. For at least some implementations, the scaling parameter a may be based on the original chroma samples and signaled in the bitstream. This may reduce decoder complexity and yield more precise predictions. In addition or alternatively, the DC contribution of the chroma component may be computed using an intra DC mode within the chroma component in some example implementations.

Figure 24:
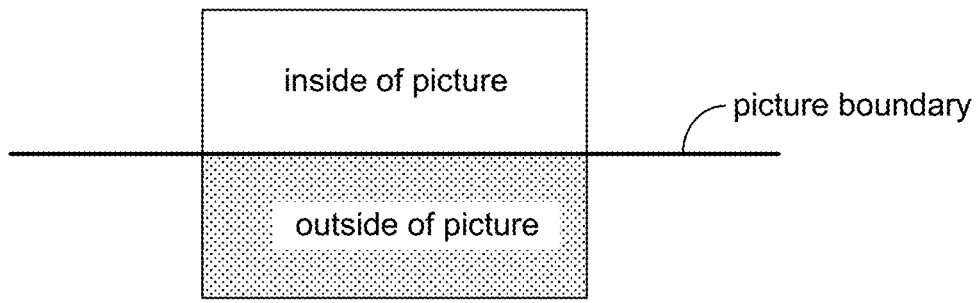
FIG. 24 shows a block diagram of luma samples inside of and outside of a picture boundary.

Additionally, in some implementations of the method 2300 or of the first CfL mode, when some luma samples of the co-located luma block are outside of the picture boundary, these luma samples may be padded, and the padded luma samples may be used to calculate the luma average, such as block 2304. FIG. 24 shows a schematic diagram of luma samples inside of and outside of a picture defined by a picture boundary. For at least some implementations, the outside picture luma samples may be padded by coping the values of the nearest available samples within the current block.

In addition or alternatively, in some implementations when perform CfL prediction, the sub-sampling performed at block 2302 may be combined with the averaging performed at block 2304 and/or the subtraction performed at block 2306. This, in turn, may simplify equations of the linear modeling, while removing sub-sampling divisions and rounding errors. Equation (2) below corresponds to the combination of both steps, which is simplified to Equation (3). Both equations (2) and (3) use integer division. Also, M×N is the matrix of pixels in the luma plane.

$$L^{AC}_{u,v} = 8 \left( \frac{S(s_x, s_y, u, v)}{s_y \times s_x} \right) - \frac{8 \sum_i \sum_j \left( \frac{S(s_x, s_y, i, j)}{s_y \times s_x} \right)}{M \times N} \quad (2)$$

-continued $$\Rightarrow \frac{1}{s_y \times s_x}\left(8 \times S(s_x, s_y, u, v) - \frac{\sum_i \sum_j 8 \times S(s_x, s_y, i, j)}{M \times N}\right) \quad (3)$$

Based on chroma sub-sampling, $S_x \times S_y \in \{1, 2, 4\}$. Also, M and N may both be powers of two, and in turn, M×N is also a power of two. For example, in the context of a 4:2:0 chroma sub-sampling, instead of applying a box filter, the sum of four reconstructed luma pixels that coincide with the chroma pixels may be used. Correspondingly, the CfL prediction may scale by two.

Additionally, as indicated above for equation (1), the CfL prediction process in FIG. 23 my employ only one linear model between luma and chroma samples within a whole coded block. However, only one linear model may be less than optimal for some relationships between luma and chroma samples within one whole coded block. In addition or alternatively, in the CfL prediction method 2300, the luma samples of a corresponding luma block are used to calculate the average, and in turn, the AC contribution. However, in at least some embodiments, the DC contribution may be determined or calculated by averaging neighbor luma samples. The non-alignment between the luma samples and the neighbor luma samples used for the AC and DC contributions, respectively, may cause inaccurate or less than optimal prediction. In addition or alternatively, signaling the scaling value a in the bitstream may undesirably consume some bits. In addition or alternatively, in the CfL prediction method 2300 in FIG. 23, a chroma block is predicted from a co-located luma block, while neighbor luma samples of the co-located luma block are not used.

Referring to FIG. 22B, in addition or alternatively to operating in the first CfL prediction mode, in some implementations, the CfL prediction unit 2202 may operate in a second CfL prediction mode (or a second set of one or more CfL prediction modes) to generate a plurality of prediction samples of a chroma block corresponding to a luma block based on neighbor luma samples of the luma block. That is, the CfL prediction unit 2202 may generate chroma prediction samples using neighbor luma samples of a luma block, without using luma samples of the luma block. Referring to FIG. 22C, in addition or alternatively to operating the first CfL prediction mode and/or the second CfL prediction mode, in some implementations, the CfL prediction unit 2202 may operate in a third CfL prediction mode (or a third set of one or more CfL prediction modes) to generate a plurality of prediction samples of a chroma block corresponding to a luma block based on luma samples of the luma block and neighbor luma samples of the luma block.

Figure 25:
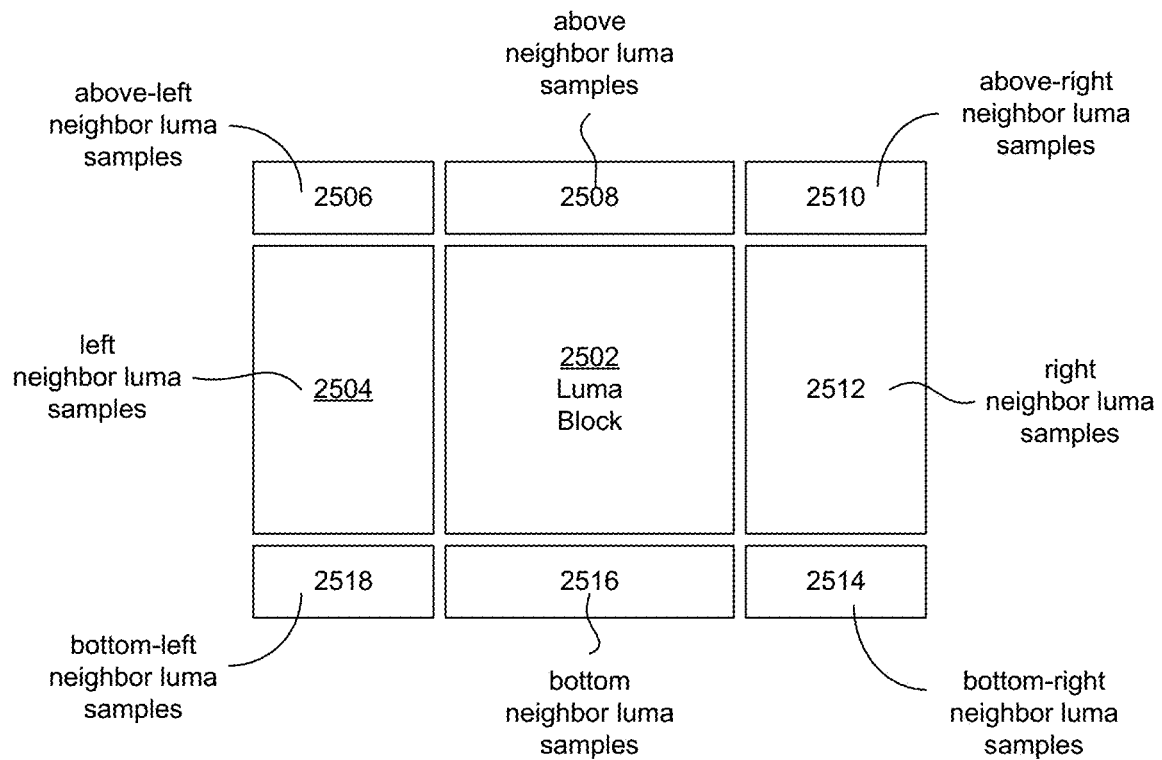
FIG. 25 shows a schematic diagram of neighbor luma samples of a luma block.

FIG. 25 shows a schematic diagram of an example luma block 2502 and neighbor luma samples of the luma block 2502. In general, a neighbor luma sample of a given luma block is a luma sample of or in an adjacent or neighbor luma block that is adjacent to and/or that neighbors the given luma block. Each neighbor luma sample may be of, or have, a certain type of a plurality types of neighbor luma samples. Each type may correspond to a relative spatial relationship with the given luma block. Similarly, each adjacent or neighbor luma block may have a certain type that matches the certain type of neighbor luma samples included therein. For at least some implementations, the plurality of types of neighbor luma samples and/or blocks may include: left, above-left, above, above-right, right, bottom-right, bottom, and bottom-left. FIG. 25 shows where neighbor luma samples may be spatially located relative to the given luma block 2502, including: left neighbor luma samples 2504 in a left neighbor luma block, above-left neighbor luma samples 2506 in an above-left neighbor luma block, above neighbor luma samples 2508 in an above neighbor luma block, above-right neighbor luma samples 2510 in an above-right neighbor luma block, right neighbor luma samples 2512 in a right neighbor luma block, bottom-right neighbor luma samples 2514 in a bottom-right neighbor luma block, bottom neighbor luma samples 2516 in a bottom neighbor luma block, and bottom-left neighbor luma samples 2518 in a bottom-left neighbor luma block. Also, the above-left, above-right, bottom-left, and bottom-right neighbor luma samples and blocks may be generally and/or collectively referred to as corner neighbor luma samples and blocks, respectively. In any of various implementations in the second CfL mode and/or the third CfL mode, the CfL prediction unit 2202 may use all types, or at least one but fewer than all types, of neighbor luma samples when performing CfL prediction.

Figure 26:
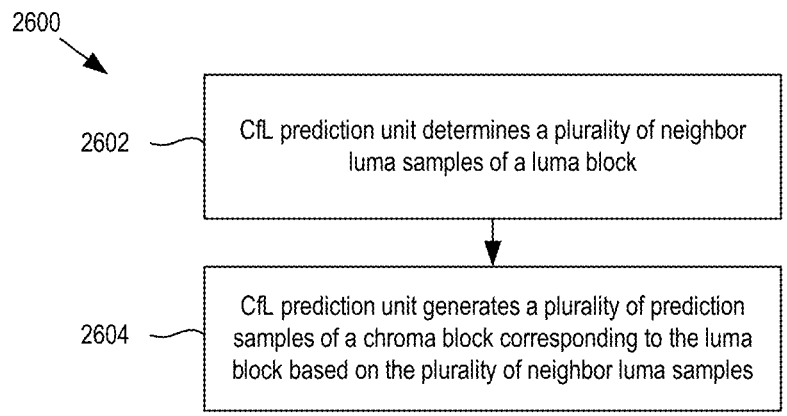
FIG. 26 shows a flow chart of another example a CfL prediction process.

FIG. 26 shows a flow chart of an example method 2600 of a CfL prediction process that the CfL prediction unit 2202 may perform when operating in the second CfL prediction mode (FIG. 22B) and/or the third CfL prediction mode (FIG. 22C). At block 2602, the CfL prediction unit 2202 may determine a plurality of neighbor luma samples of a luma block. At block 2604, the CfL prediction unit 2202 may generate a plurality of prediction samples of a chroma block corresponding to the luma block based on the plurality of neighbor luma samples.

Figure 27:
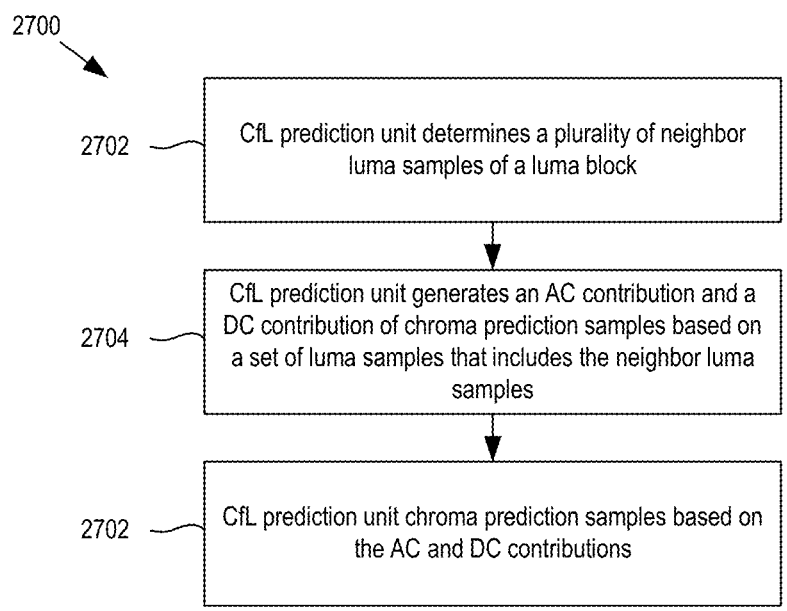
FIG. 27 shows a flow chart of another example CfL prediction process.

FIG. 27 shows a flow chart of another example method 2700 of a CfL prediction process that the CfL prediction unit 2202 may perform when operating in the second CfL prediction mode (FIG. 22B) and/or the third CFL prediction mode (FIG. 22C). At block 2702, the CfL prediction unit 2202 may determine a plurality of neighbor luma samples of a luma block. At block 2704, the CfL prediction unit 2202 may generate an AC contribution and a DC contribution of a plurality of prediction samples of a chroma block corresponding to the luma block. At least one of the AC contribution or the DC contribution is generated at block 2704 based on a set of luma samples that includes the plurality of neighbor luma samples determined at block 2702. At block 2706, the CfL prediction unit 2202 may generate the plurality of prediction samples of the chroma block based on the AC contribution and the DC contribution determined at block 2704. For at least some implementations, the CfL prediction unit 2202 may determine the plurality of chroma prediction samples at block 2706 using the AC and DC contributions according to the linear model in equation (1) above.

In some implementations, the example methods 2600 and 2700 may be combined. For example, block 2602 may include block 2702, and block 2604 may include blocks 2704 and/or blocks 2706.

Figure 28:
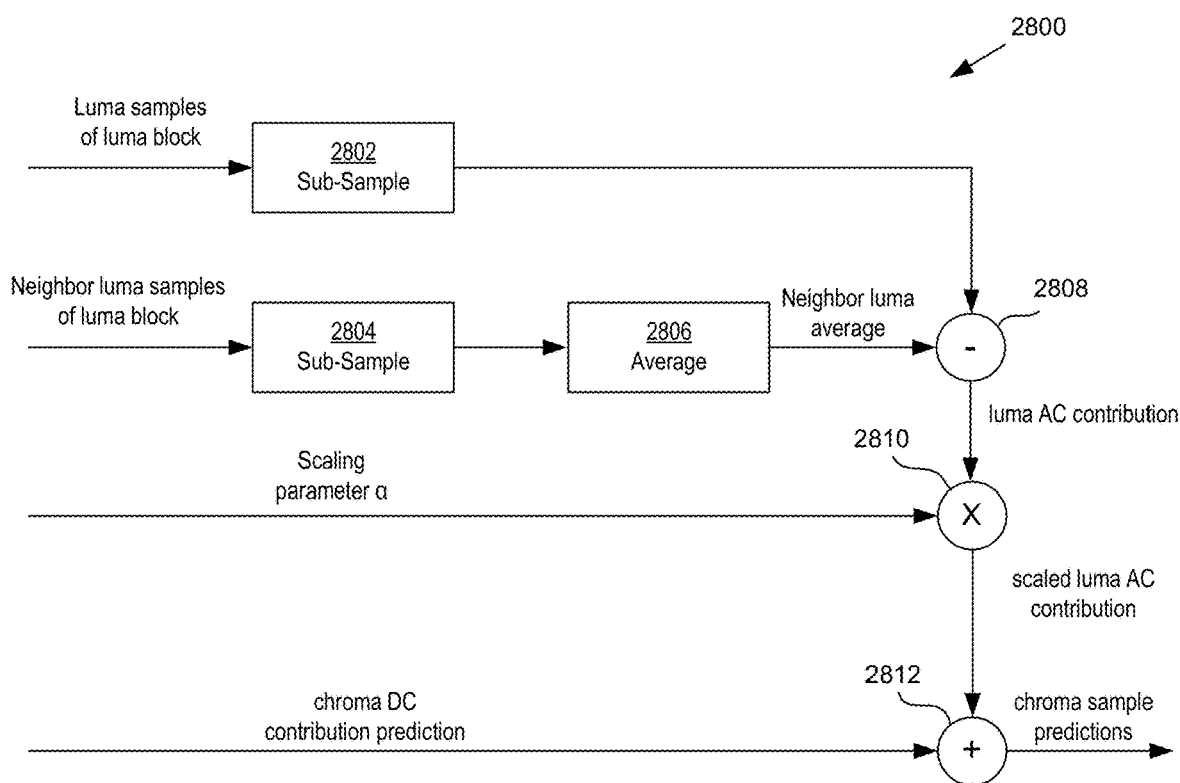
FIG. 28 shows a flow diagram of another example CfL prediction process.

FIG. 28 shows a flow diagram of another example method 2800 of a CfL prediction process that the CfL prediction unit 2202 may perform when operating in the third CfL prediction mode (FIG. 22C). The CfL prediction process 2800 may be similar to the CfL prediction process 2300 in FIG. 23, except that instead of averaging the luma samples of the luma block, the CfL prediction process 2800 may average the neighbor luma samples to generate a neighbor luma average. Accordingly, the AC contribution is based on both the luma samples and the neighbor luma samples of the luma block.

In further detail, at block 2802, a plurality of luma samples of the luma block may be sub-sampled into a chroma resolution. At block 2804, a plurality of neighbor luma samples of the luma block may be sub-sampled into the chroma resolution. Additionally, for at least some implementations, the same sub-sampling (or down-sampling) method is used to sub-sample the luma samples and the neighbor luma samples (i.e., the same sub-sampling method is applied at both blocks 2802 and 2804). For example, if sub-sampling is performed according to a 4:2:0 format, two rows in the above neighbor area (e.g., area 2508 in FIG. 25), two columns in the left neighbor area (e.g., area 2504 in FIG. 25), and/or four pixels in the above-left area (e.g., area 2506 in FIG. 25) are sub-samples (or down-sampled). Correspondingly, when the CfL prediction unit 2202 determines the AC contribution (e.g., blocks 2806 and 2808 below), the neighbor luma samples may be averaged and subtracted from the reconstructed luma sample values, as shown in FIG. 28 and further described below.

In further detail, at block 2806, the sub-sampled neighbor luma samples may be averaged to generate a neighbor luma average. At block 2808, the neighbor luma average may be subtracted from the sub-sampled luma samples to generate the AC contribution of the luma component. At block 2808, the AC contribution of the luma component may be multiplied by the scaling parameter a to generate a scaled AC contribution of the luma component. The scaled AC contribution of the luma component may also be an AC contribution prediction of the chroma component. At block 2812, the DC contribution prediction of the chroma component may be added to the AC contribution prediction to generate the chroma prediction samples, such as in accordance with the linear model depicted above in equation (1). For at least some implementations, the scaling parameter a may be based on the original chroma samples and signaled in the bitstream. This may reduce decoder complexity and yield more precise predictions. In addition or alternatively, the DC contribution of the chroma component may be computed using an intra DC mode within the chroma component in some example implementations.

In other implementations of the example method 2800, the plurality of neighbor luma samples may not be sub-sampled before used to determine the neighbor luma average. That is, in these other implementations, block 2804 may be skipped or otherwise not performed.

Also, in some implementations, all or some of the blocks of the method 2800 may be combined with the method 2600 and/or the method 2700. For example, after the neighbor luma samples are determined at block 2602 and/or 2702, they may be sub-sampled at block 2804 and/or averaged at block 2806. In addition or alternatively, generating the chroma prediction samples based on the neighbor luma samples at block 2604 may include one or more of: sub-sampling the neighbor luma samples at block 2804, averaging the (sub-sampled) neighbor luma samples at block 2806, generating the luma AC contribution at block 2808, and/or scaling the luma AC contribution at block 2810. In addition or alternatively, generating the AC contribution at block 2704 in the method 2700 may include one or more of: sub-sampling the neighbor luma samples at block 2804, averaging the (sub-sampled) neighbor luma samples at block 2806, generating the luma AC contribution at block 2808, and/or scaling the luma AC contribution at block 2810. In addition or alternatively, generating the chroma prediction samples based on the AC and DC contributions at block 2706 of the method 2700 may include adding the DC contribution to the AC contribution at block 2812. Other ways to combine methods 2600, 2700, and/or 2800 may be possible.

Figure 29:
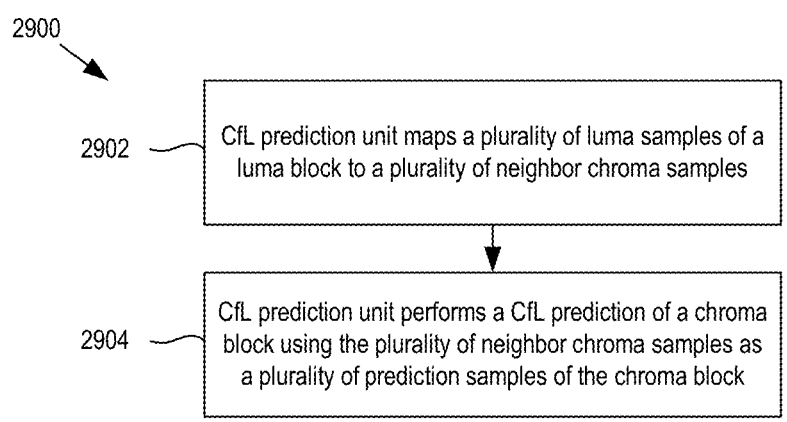
FIG. 29 shows a flow chart of another example CfL prediction process.

FIG. 29 shows a flow chart of another example method 2900 of a CfL prediction process that the CfL prediction unit 2202 may perform when operating in the third CfL prediction mode (FIG. 22C). At block 2902, the CfL prediction unit 2202 may map a plurality of luma samples of a luma block to a plurality of neighbor chroma samples. For example, the CfL prediction unit 2202 may map each ith-jth luma pixel $PL_{ij}$ at position (i,j) of the luma block to a kth neighbor chroma pixel $PC_k$. Also, for at least some implementations, at block 2902, the CfL prediction unit 2202 may determine that a chroma block is to be predicted in a CfL mode, where the chroma block corresponds to and/or is co-located with a luma block. The CfL prediction unit 2202 may then map a plurality of luma samples of the luma block to a plurality of neighbor chroma samples that are in at least one neighbor chroma block that neighbors the chroma block to be predicted. At block 2904, the CfL prediction unit 2202 may perform a CfL prediction of the chroma block using the plurality of neighbor chroma samples as a plurality of prediction samples of the chroma block. For example, the CfL prediction unit 2202 may set the plurality of neighbor chroma samples as a plurality of prediction samples of the chroma block corresponding to the luma block. That is, the CfL prediction unit 2202 may copy each kth chroma pixel $PC_k$ to a corresponding ith-jth chroma sample $PC_{ij}$. The CfL prediction unit 2202 may use the same relationship or mapping between the (i,j) positions and the neighbor index k determined at block 2902 to set each kth chroma pixel $PC_k$ to a respective ith-jth chroma sample $PC_{ij}$. The CfL prediction method 2900 in FIG. 29 may avoid using a scaling parameter a and/or avoid consuming resources to signal the scaling parameter a.

Figure 30:
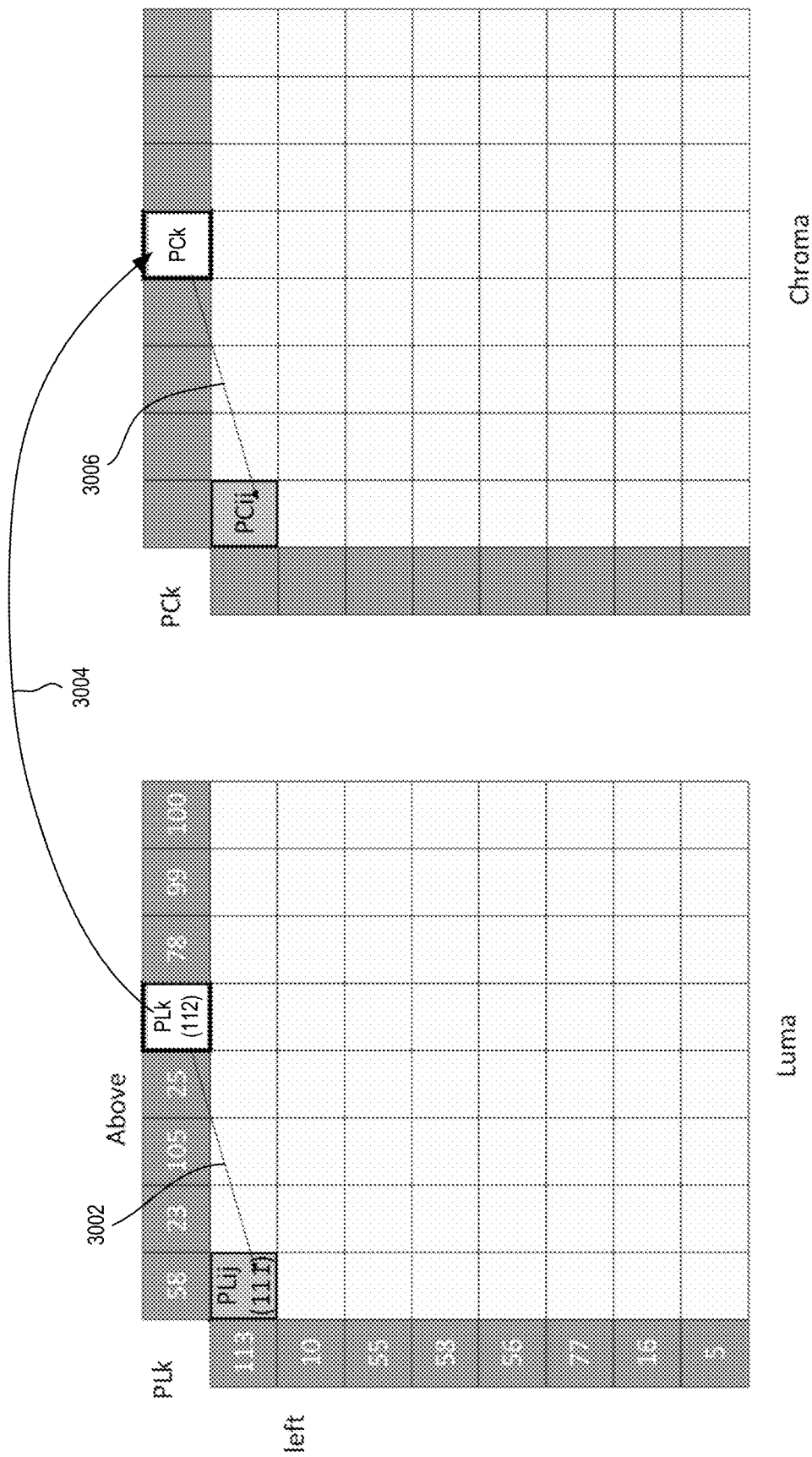
FIG. 30 shows a schematic diagram of a luma sample mapped to a neighbor chroma sample for CfL prediction of chroma sample corresponding to the luma sample.

For at least some implementations, the CfL prediction unit 2202 may map the plurality of luma samples of the luma block to the plurality of neighbor chroma samples at block 2902 in two steps. First, the CfL prediction unit 2202 may map the plurality of luma samples to a plurality of neighbor luma samples. For example, the CfL prediction unit 2202 may map each ith-jth pixel $PL_{ij}$ to a respective kth neighbor luma pixel $PL_k$. To illustrate, FIG. 30 shows a particular chroma pixel $PL_{ij}$ (111) mapped to an above kth neighbor luma sample $PL_k$ (112), denoted by arrow 3002. Then, the CfL prediction unit 2202 may map the neighbor luma samples to corresponding neighbor chroma samples, or otherwise determine the neighbor chroma samples that correspond to and/or are co-located with the neighbor luma samples. For example, FIG. 30 shows the kth neighbor luma pixel $PL_k$ (112) corresponding to or co-located with neighbor chroma pixel $PC_k$, via arrow 3004. Through the two-step process, the plurality of luma samples may be mapped or correspond to a plurality of neighbor chroma samples. The CfL prediction unit 2202 may then use the plurality of neighbor chroma samples as the plurality of prediction samples of the corresponding chroma block for CfL prediction of the chroma block, such as performed at block 2904. For example, FIG. 30 shows, via arrow 3006, the kth neighbor chroma sample $PC_k$ being set as or copied to the ith-jth chroma sample $PC_{ij}$ that corresponds to the ith-jth luma sample $PL_{ij}$.

In addition, for at least some implementations of the two-step process, when mapping the luma samples to the neighbor luma samples, for each ith-jth luma sample $PL_{ij}$, the CfL prediction unit 2202 may determine the neighbor luma sample that has the smallest difference with the ith-jth luma sample $PL_{ij}$. Also, for at least some of these implementations, in event that the CfL prediction unit 2202 determines multiple neighbor luma samples that have the smallest difference with the ith-jth luma sample $PL_{ij}$, the CfL prediction unit 2202 may select a target kth neighbor luma sample $PL_k$ from among the multiple smallest-difference neighbor luma samples that has the smallest distance to the ith-jth luma sample $PL_{ij}$. The CfL prediction unit 2202 may include the target kth neighbor luma samples in the smallest-difference luma samples used to determine the chroma prediction samples.

In addition or alternatively, in some implementations, when determining the smallest differences between the luma samples and the neighbor luma samples, the CfL prediction unit 2202 may determine the smallest differences according to a sum of absolute difference (SAD) measurement and/or a sum of squared error (SSE) measurement.

In addition or alternatively, in some implementations, the CfL prediction unit 2202 may map multiple luma samples together to multiple neighbor luma samples. Multiple luma samples that are mapped together may be referred to as patches. For example, the CfL prediction unit 2202 may identify a given patch of luma samples, and find a patch of neighbor luma samples that has the smallest difference with the given patch of luma samples. For at least some of these implementations, the CfL prediction unit 2202 may use the center samples or pixels of the patches to determine a neighbor luma patch that has the smallest difference with the given luma path. Upon identifying the neighbor luma patch with the smallest difference, the CfL prediction unit 2202 may map each luma sample of the luma patch to each neighbor luma sample of the smallest-difference neighbor luma patch. For at least some of these implementations, the CfL prediction unit 2202 may use SSE to determine the smallest difference. Also, in some implementations, sub-block sizes can vary. In addition or alternatively, in some implementations, only a subset of all neighbor luma samples are analyzed to determine the smallest-difference neighbor luma samples.

Figure 31:
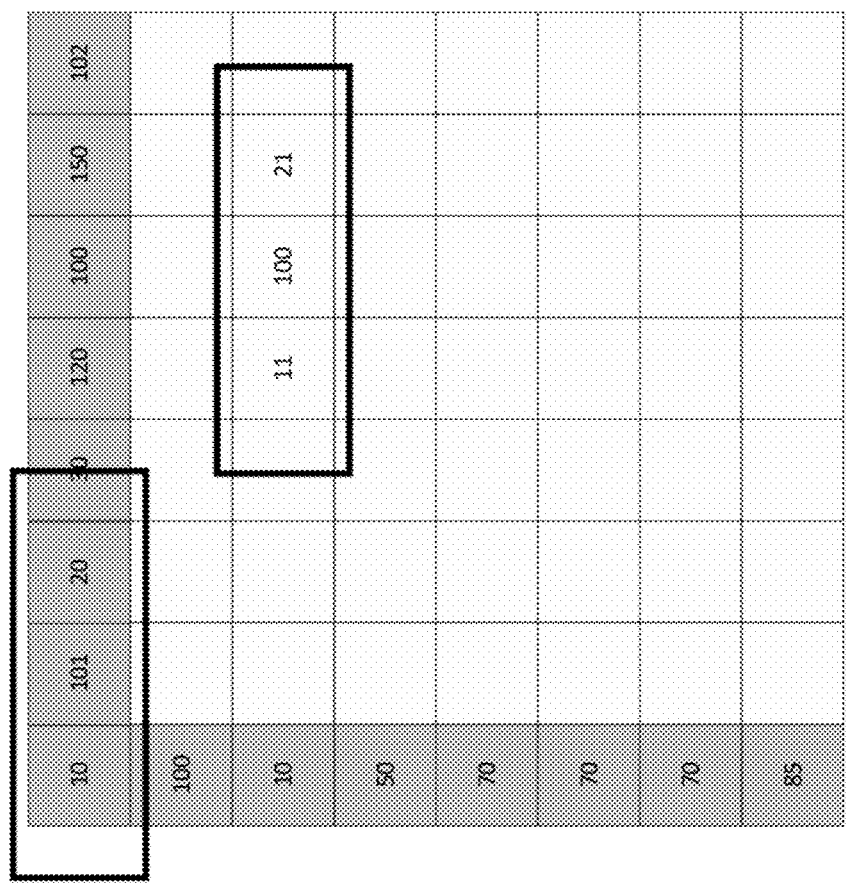
FIG. 31 shows a schematic diagram of mapping luma sample to neighbor luma samples on a patch basis.

FIG. 31 illustrates an example of mapping luma samples to neighbor luma samples on a patch basis, which may be used as part of mapping the plurality of luma samples to a plurality of neighbor chroma samples at block 2902. In the example, three luma samples 11, 100, 21 may form a luma patch. The CfL prediction unit 2202 may analyze neighbor luma patches having three neighbor luma samples. For each candidate neighbor luma patch, the CfL prediction unit 2202 may compare the center luma sample with the center neighbor luma sample of the candidate neighbor luma patch to determine a difference for the neighbor luma patch. In the example in FIG. 31, the CfL prediction unit 2202 determines that the neighbor luma sample having the smallest difference with center luma sample 100 is neighbor luma sample 101. In turn, the CfL prediction unit 2202 may map luma sample 11 with neighbor luma sample 10, luma sample 100 with neighbor luma sample 101, and luma sample 21 with neighbor luma sample 20. After the luma samples of the luma block are mapped to neighbor luma samples on a patch basis, such as illustrated in FIG. 31, the neighbor chroma samples corresponding to the neighbor luma samples may be determined, which then may be set as, or copied to, the chroma samples of the corresponding chroma block, such as previously described with respect to FIGS. 29 and 30.

Also, in some implementations, all or some blocks of the method 2900 may be combined with the method 2600. For example, determining the neighbor luma samples at block 2602 may include mapping the luma samples to neighbor luma samples performed at block 2902. Alternatively, the CfL prediction unit 2202 may determine a plurality of neighbor luma samples, and then using those neighbor luma samples, map the luma samples to at least some of the neighbor luma samples at block 2602. In addition or alternatively, in various implementations, generating the chroma prediction samples at block 2604 may include mapping luma samples to neighbor chroma samples at block 2902 and/or setting the neighbor chroma samples as the plurality of chroma prediction samples at block 2904.

Also, in any of various implementations of the example methods 2600, 2700, 2800, 2900, the neighbor luma samples that the CfL prediction unit 2202 determines, sub-samples, averages, and/or otherwise uses to generate the plurality of chroma prediction samples may include all, or at least one and fewer than all, types of neighbor luma samples, including at least one of: left, above-left, above, above-right, right, bottom-right, bottom, or bottom-left. For example, in some implementations, the at least one type may include at least one of: left, above, or above-left. In some other implementations, the at least one type may include at least one of: left, above, right, bottom, above-left, above-right, bottom-left, or bottom right. In some other implementations, the at least one type may include at least one of: above-right or bottom-left. Also, in any of various implementations, including the implementations of methods 2600, 2700, and/or 2800, when the CfL prediction unit 2202 determines to use a type of neighbor luma sample for a CfL prediction process, the CfL prediction unit 2202 may use one or more neighbor luma samples that have that determined type.

In addition or alternatively, in some implementations of the example methods 2600, 2700, 2800, and/or 2900, signaling may be used to expressly indicate to, or instruct, the CfL prediction unit 2202 as to which of the types of neighbor luma samples to use for a CfL prediction process. For example, the CfL prediction unit 2202 may receive a signal that is internally generated, such as by another unit or component of the electronic device (e.g., encoder or decoder) in which the CfL prediction unit 2202 is implemented, or that is externally or remotely generated, such as by another unit or component of a different or separate electronic device (e.g., encoder or decoder) in which the CfL prediction unit 2202 is implemented. In some other implementations, code information and/or properties of the luma block and/or predicted chroma block may be used to implicitly indicate which of the types of neighbor luma samples to use for a CfL prediction process, non-limiting examples of which include an intra prediction mode, a block shape, a block size, or a block aspect ratio of the luma block and/or the chroma block.

In addition or alternatively, in some implementations of the example methods 2600, 2700, 2800, and/or 2900, only those types of neighbor luma samples that are available may be used for a CfL prediction process. In some implementations, a neighbor luma sample is available if it is not at a picture boundary or a super block boundary. For example, the CfL prediction unit 2202 may use the above neighbor luma samples for CfL prediction (e.g, determine the above neighbor luma samples at block 2602, and/or generate the chroma prediction samples based on the above neighbor luma samples at block 2604) when only the above neighbor luma samples are available. As another example, the CfL prediction unit may use the left neighbor luma samples for CfL prediction (e.g., determine the left neighbor luma samples at block 2602, and/or generate the chroma prediction samples based on the left neighbor luma samples at block 2604) when only the left neighbor luma samples are available.

In addition or alternatively, in some implementations of the example methods 2600, 2700, 2800, and/or 2900, when a particular type of neighbor luma samples is determined to be used in the CfL prediction process, and all of the neighbor luma samples of the particular type are not available, the CfL prediction unit 2202 may pad the neighbor luma samples of the particular type, and use the padded neighbor luma samples in the CfL prediction process. For example, in event the left neighbor luma samples are not available, then padding may include copying the luma samples in the left column of the current luma block as the left neighbor luma samples. As another example, in event that the above neighbor luma samples are not available, then padding may include copying the luma samples in a top-most row of the current luma block as the above neighbor luma samples. For at least some of these implementations, the CfL prediction unit may mad the neighbor luma samples according to the same padding method used in an intra angular prediction mode.

In addition or alternatively, in some implementations of the example methods 2600, 2700, 2800, and/or 2900, when the above neighbor luma samples are determined to be used for a CfL prediction process, the CfL prediction unit 2202 may use only those above neighbor luma samples in a nearest above reference line in the CfL prediction process. In particular of these implementations, the CfL prediction unit 2202 may use the above neighbor luma samples in the nearest above reference line as the neighbor luma samples for the CfL prediction process when the co-located luma block is located at a super block boundary. In general, AoMediaVideo Model (AVM) uses coding blocks of various sizes with the largest being called superblocks. For some implementations, the largest blocks, or super blocks, are 128×128 pixels or 64×64 pixels. The super block size is signaled in the sequence header and has a default size of 128×128 pixels. The minimum coding block size is 4×4.

Figure 32:
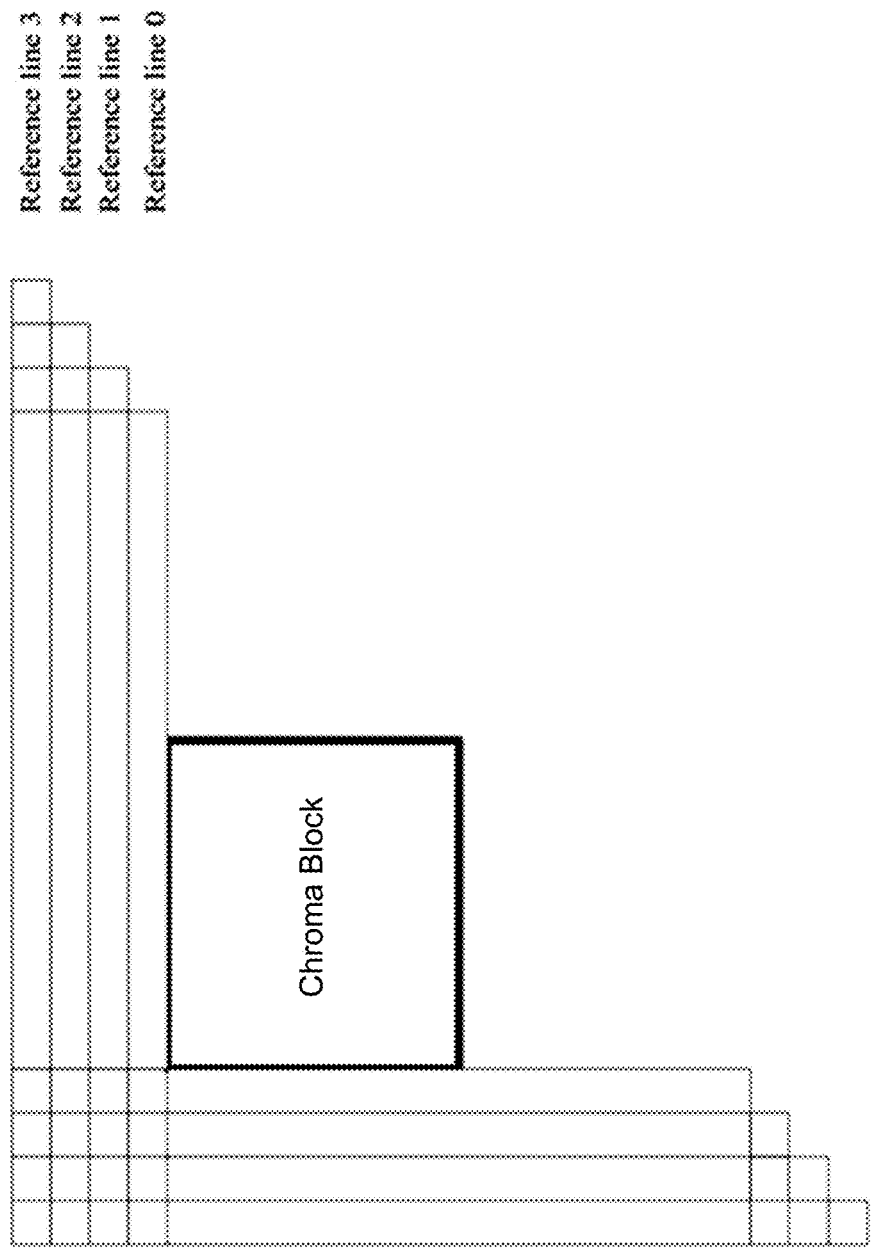
FIG. 32 shows a schematic diagram of example four-reference line intra-coding for a chroma block.

In addition or alternatively, in some implementations of the example methods 2600, 2700, 2800, and/or 2900, the neighbor luma samples used in the CfL prediction process may include, such as only include in some implementations, neighbor luma samples in the nearest adjacent reference line or lines. At least some of these implementations may be used in combination with one or more of the other, above-described conditions or aspects. For example, when the CfL prediction unit 2202 determines to use a particular type of neighbor luma samples, the CfL prediction unit 2202 may use those neighbor luma samples of the particular type that are in the nearest adjacent reference line of the particular type. FIG. 32 shows a diagram illustrating reference lines above and to the left of a co-located chroma block. In the example, Reference line 0 may be the nearest above adjacent reference, in that it is closer or nearer than other above Reference lines 1, 2, and 3.

In addition or alternatively, in some implementations of the example methods 2600, 2700, 2800, and/or 2900, the CfL prediction unit 2202 may use one or more boundary luma samples of the luma block to perform the CfL prediction process. A boundary luma sample may be a luma sample that defines an outer boundary of a chroma block. For example, a left boundary luma sample of a given luma block defines, at least in part, a left boundary of the given chroma block. As another example, a top boundary defines, at least in part, a top or upper boundary of the given luma block. The CfL prediction unit 2202 may use the one or more boundary luma samples in combination with the neighbor luma samples. For example, in an implementation of the method 2800, the CfL prediction unit 2202 may determine the neighbor luma average by averaging neighbor luma samples in combination with one or more boundary luma samples of the co-located chroma block. In various of these implementations, the boundary luma samples used for the averaging may be obtained before sub-sampling, such as before the sub-sampling at block 2802 or from the sub-sampled luma samples after sub-sampling, such as after the sub-sampling at block 2802. In particular of these implementations, the one or more boundary luma samples may include one or more top boundary luma samples and/or one or more left boundary luma samples.

Figure 33:
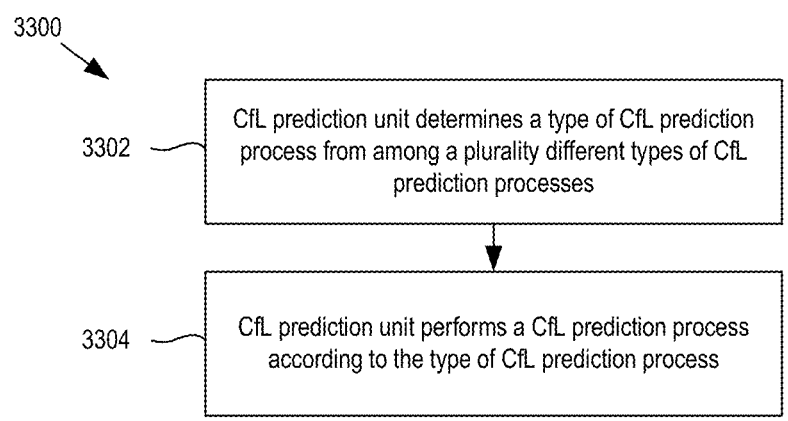
FIG. 33 shows a flow chart of another example CfL prediction process.

FIG. 33 shows a flow chart of another example method 3300 of a CfL prediction process that the CfL prediction unit 2202 may perform. At block 3302, the CfL prediction unit 2202 may determine a type of CfL prediction process from among a plurality of types of CfL prediction processes. The plurality of types of CfL prediction processes may correspond to at least two of the CfL prediction processes 2300, 2600, 2700, 2800, or 2900. At block 3304, the CfL prediction unit 2202 may perform a CfL prediction process according to the type of CfL prediction process it determined at block 3302.

In some implementations, the CfL prediction unit 2202 selects from only two of the CfL prediction processes 2300, 2600, 2700, 2800, 2900. The two processes that are selected from can be any two of the processes 2300, 2600, 2700, 2800, 2900 in any of various implementations. In addition or alternatively, in at least some implementations, at block 3302, the CfL prediction unit 2202 may receive, identify, and/or use a flag to determine which type of CfL prediction process to use. In some of these implementations, the flag is bypass coded. In other implementations, the flag is context coded. In various embodiments, N contexts may be used, where N is one or more. In some other implementations, different CfL prediction processes are associated with different index values of a chroma intra prediction mode syntax, which the CfL prediction unit 2202 may receive, identify, and/or use. The chroma intra prediction mode syntax may indicate to the CfL prediction unit 2202 whether to perform a CfL prediction process, and if so, which type of CfL prediction process to perform. In any of various implementations, the index value may be one of two, three or more possible different values to indicate one from among two, three, or more possible different CfL prediction processes.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 34 shows a computer system 3400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 34:
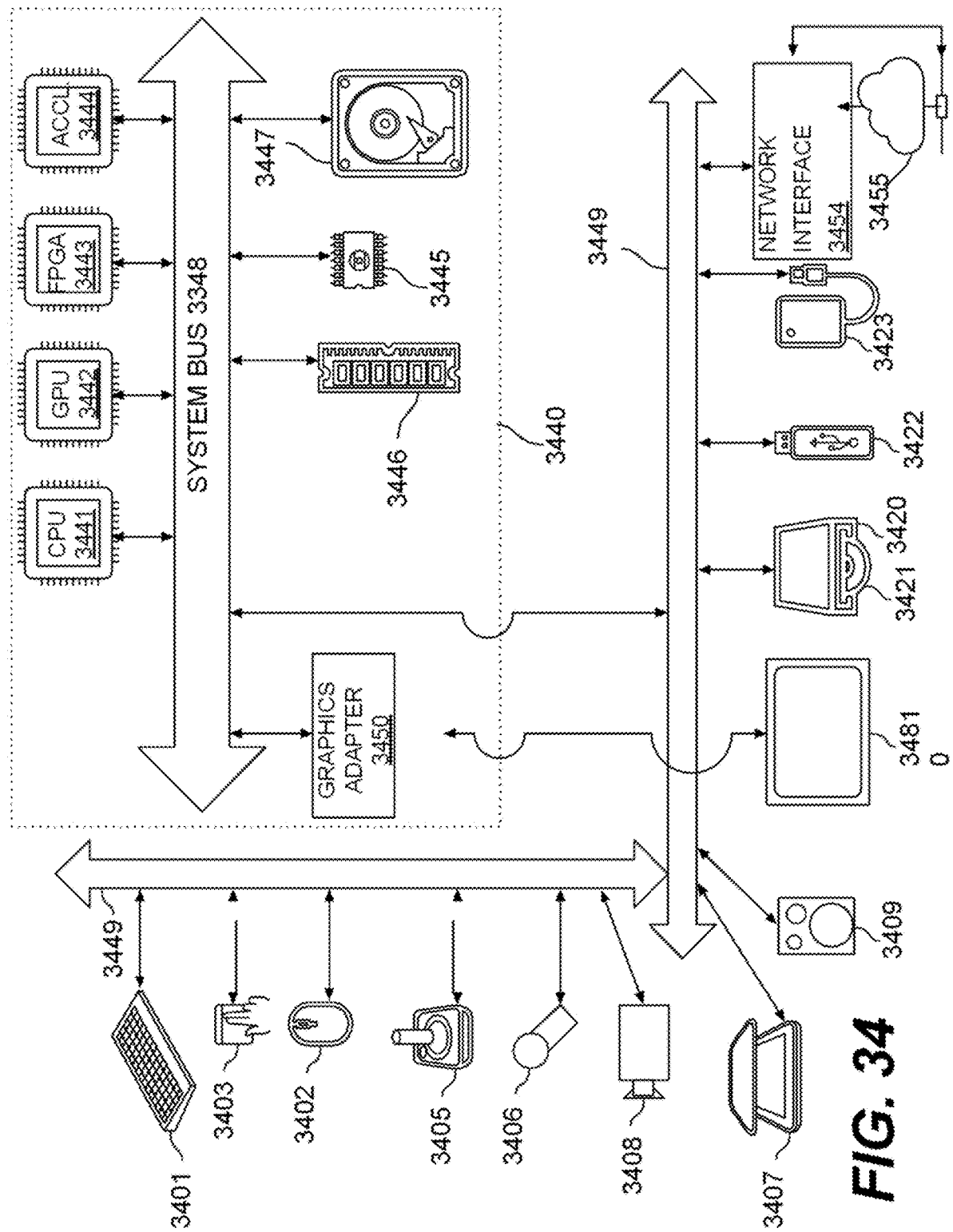
FIG. 34 shows a schematic illustration of a computer system in accordance with example embodiments of the disclosure.

The components shown in FIG. 34 for computer system 3400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 3400.

Computer system 3400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 3401, mouse 3402, trackpad 3403, touch screen 3410, data-glove (not shown), joystick 3405, microphone 3406, scanner 3407, camera 3408.

Computer system 3400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 3410, data-glove (not shown), or joystick 3405, but there can also be tactile feedback devices that do not serve as input devices), audio output devices (such as: speakers 3409, headphones (not depicted)), visual output devices (such as screens 3410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 3400 can also include human accessible storage devices and their associated media such as optical media including CD/DVD ROM/RW 3420 with CD/DVD or the like media 3421, thumb-drive 3422, removable hard drive or solid state drive 3423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 3400 can also include an interface 3454 to one or more communication networks 3455. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses 3449 (such as, for example USB ports of the computer system 3400); others are commonly integrated into the core of the computer system 3400 by attachment to a system bus as described below (for example Ethernet interface into a PC computer system or cellular network interface into a smartphone computer system). Using any of these networks, computer system (3400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 3440 of the computer system 3400.

The core 3440 can include one or more Central Processing Units (CPU) 3441, Graphics Processing Units (GPU) 3442, specialized programmable processing units in the form of Field Programmable Gate Areas (FPGA) 3443, hardware accelerators for certain tasks 3444, graphics adapters 3450, and so forth. These devices, along with Read-only memory (ROM) 3445, Random-access memory 3446, internal mass storage such as internal non-user accessible hard drives, SSDs, and the like 3447, may be connected through a system bus 3448. In some computer systems, the system bus 3448 can be accessible in the form of one or more physical plugs to enable extensions by additional CPUs, GPU, and the like. The peripheral devices can be attached either directly to the core's system bus 3448, or through a peripheral bus 3449. In an example, the screen 3410 can be connected to the graphics adapter 3450. Architectures for a peripheral bus include PCI, USB, and the like.

CPUs 3441, GPUs 3442, FPGAs 3443, and accelerators 3444 can execute certain instructions that, in combination, can make up the aforementioned computer code. That computer code can be stored in ROM 3445 or RAM 3446. Transitional data can also be stored in RAM 3446, whereas permanent data can be stored for example, in the internal mass storage 3447. Fast storage and retrieve to any of the memory devices can be enabled through the use of cache memory, that can be closely associated with one or more CPU 3441, GPU 3442, mass storage 3447, ROM 3445, RAM 3446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture 3400, and specifically the core 3440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 3440 that are of non-transitory nature, such as core-internal mass storage 3447 or ROM 3445. The software implementing various embodiments of the present disclosure can be stored in such devices and executed by core 3440. A computer-readable medium can include one or more memory devices or chips, according to particular needs. The software can cause the core 3440 and specifically the processors therein (including CPU, GPU, FPGA, and the like) to execute particular processes or particular parts of particular processes described herein, including defining data structures stored in RAM 3446 and modifying such data structures according to the processes defined by the software. In addition, or as an alternative, the computer system can provide functionality as a result of logic hardwired or otherwise embodied in a circuit (for example: accelerator 3444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The subject matter of the disclosure may also relate to or include, among others, the following aspects:

In a first aspect, a method for video processing includes: determining that a chroma block is to be predicted in a Chroma from Luma (CfL) mode, wherein the chroma block corresponds to a luma block; mapping a plurality of luma samples of the luma block to a plurality of neighbor chroma samples in at least one neighbor chroma block that neighbors the chroma block; and performing a CfL prediction of the chroma block using the plurality of neighbor chroma samples as a plurality of prediction samples of the chroma block.

A second aspect includes the first aspect, and further includes wherein the mapping comprises: mapping the plurality of reconstructed luma samples to a plurality of reconstructed neighbor luma samples; and mapping the plurality of reconstructed neighbor luma samples to the plurality of neighbor chroma samples.

A third aspect includes any of the first or second aspects, and further includes: determining a plurality of reconstructed neighbor luma samples to map to the plurality of reconstructed luma samples by: determining a plurality of smallest-difference reconstructed neighbor luma samples corresponding to the plurality of reconstructed luma samples; and setting the plurality of smallest-difference reconstructed neighbor luma samples as the plurality of reconstructed neighbor luma samples.

A fourth aspect include the third aspect, and further includes wherein determining the plurality of smallest-difference reconstructed neighbor luma samples comprises: identifying multiple smallest-difference reconstructed neighbor luma samples for a luma sample of the plurality of reconstructed luma samples; selecting a target smallest-difference reconstructed neighbor luma sample from among the multiple smallest-different reconstructed neighbor luma samples in response to the target smallest-difference reconstructed neighbor luma sample having a smallest distance to the luma sample among the multiple smallest-difference reconstructed neighbor luma samples; and including the target smallest-difference reconstructed neighbor luma sample in the plurality of smallest-difference reconstructed neighbor luma samples.

A fifth aspect includes any of the third or fourth aspects, and further includes wherein determining the plurality of smallest-difference reconstructed neighbor luma samples comprises: determining the plurality of smallest-difference reconstructed neighbor luma samples according to at least one of: sum of absolute difference (SAD) measurements or sum of squared error (SSE) measurements.

A sixth aspect includes any of the first through fifth aspects, and further includes wherein mapping the plurality of reconstructed luma samples to the plurality of neighbor chroma samples comprises: mapping a patch of reconstructed luma samples to a patch of neighbor reconstructed luma samples.

A seventh aspect includes the sixth aspect, and further includes wherein the patch of neighbor reconstructed luma samples comprises a smallest-difference patch corresponding to the path of reconstructed luma samples.

An eighth aspect includes the seventh aspect, and further includes: determining the smallest-distance patch based on a center luma sample of the patch of reconstructed luma samples and a center luma sample of the smallest-difference patch.

A ninth aspect includes any of the second through eighth aspects, and further includes wherein the plurality of reconstructed neighbor luma samples comprises less than all types of reconstructed neighbor luma samples.

A tenth aspect includes the ninth aspect, and further includes wherein the less than all types of reconstructed luma samples comprises at least one of: left reconstructed neighbor luma samples, above reconstructed neighbor luma samples, or above-left reconstructed neighbor luma samples.

An eleventh aspect includes any of the second through tenth aspects, and further includes wherein the plurality of reconstructed neighbor luma samples are in a nearest adjacent reference line.

A twelfth aspect includes a method for video processing that includes: determining a type of chroma from luma (CfL) prediction process from among a plurality of different types of CfL prediction processes; and performing a CfL prediction process according to the type of CfL prediction process.

A thirteenth aspect includes the twelfth aspect, and further includes wherein the plurality of different types of CfL prediction processes comprises only two types of CFL prediction processes.

A fourteenth aspect includes the twelfth aspect, and further includes wherein the plurality of different types of CfL prediction processes comprises only three types of CfL prediction processes.

A fifteenth aspect includes any of the twelfth through fourteenth aspects, and further includes wherein a first type of CfL prediction process uses one or more neighbor luma samples to determine a plurality of chroma prediction samples, and a second type of CfL prediction process does not use neighbor luma samples to determine the plurality of chroma prediction samples.

A sixteenth aspect includes any of the twelfth through fifteenth aspects, and further includes wherein one type of CfL prediction process maps a plurality of luma samples to a plurality of neighbor chroma samples.

A seventeenth aspect includes the sixteenth aspect, and further includes wherein the one type of CfL prediction process does not use a scaling factor to determine an alternating current (AC) contribution of a plurality of chroma prediction samples.

An eighteenth aspect includes any of the twelfth through seventeenth aspects, and further includes wherein determining the type of CfL prediction process comprises: identifying a flag that indicates the type of CfL prediction process, wherein the flag is one of bypass coded or context coded.

A nineteenth aspect includes any of the twelfth through eighteenth aspects, and further includes wherein determining the type of CfL prediction process comprises: identifying a chroma intra prediction mode syntax identifying the type of CfL prediction process.

A twentieth aspect includes a video processing device that includes: a memory storing a set of instructions; and a processor configured to execute the set of instructions, and upon execution of the set of instructions, is configured to implement any of the first through nineteenth aspects.

A twenty-first aspect includes a non-transitory computer readable storage medium storing a plurality of instructions executable by a processor, that when executed by the processor, cause the processor to implement any of the first through nineteenth aspects.

In addition to the features mentioned in each of the independent aspects enumerated above, some examples may show, alone or in combination, the optional features mentioned in the dependent aspects and/or as disclosed in the description above and shown in the figures.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
HDR: high dynamic range
SDR: standard dynamic range
JVET: Joint Video Exploration Team
MPM: most probable mode
WAIP: Wide-Angle Intra Prediction
CU: Coding Unit
PU: Prediction Unit
TU: Transform Unit
CTU: Coding Tree Unit
PDPC: Position Dependent Prediction Combination
ISP: Intra Sub-Partitions
SPS: Sequence Parameter Setting
PPS: Picture Parameter Set
APS: Adaptation Parameter Set
VPS: Video Parameter Set
DPS: Decoding Parameter Set
ALF: Adaptive Loop Filter
SAO: Sample Adaptive Offset
CC-ALF: Cross-Component Adaptive Loop Filter
CDEF: Constrained Directional Enhancement Filter
CCSO: Cross-Component Sample Offset
LSO: Local Sample Offset
LR: Loop Restoration Filter
AV1: AOMedia Video 1
AV2: AOMedia Video 2
LFNST: low-Frequency Non-Separable Transform
IST: Intra Secondary Transform

What is claimed is:

1. A method of video decoding, the method comprising:
    determining that a chroma block is to be predicted in a Chroma from Luma (CfL) mode, wherein the chroma block corresponds to a luma block;
    determining a plurality of reconstructed neighbor luma samples by identifying a plurality of smallest-difference reconstructed neighbor luma samples of the luma block, including:
        identifying multiple smallest-difference reconstructed neighbor luma samples;
        selecting a target smallest-difference reconstructed neighbor luma sample from among the multiple smallest-different reconstructed neighbor luma samples in accordance with the target smallest-difference reconstructed neighbor luma sample having a smallest distance to the luma sample among the multiple smallest-difference reconstructed neighbor luma samples; and
        including the target smallest-difference reconstructed neighbor luma sample in the plurality of smallest-difference reconstructed neighbor luma samples:
    mapping the plurality of reconstructed luma samples of the luma block to a plurality of neighbor chroma samples in at least one neighbor chroma block that neighbors the chroma block; and
    performing a CfL prediction of the chroma block using the plurality of neighbor chroma samples as a plurality of prediction samples of the chroma block.

2. The method of claim 1, wherein the mapping comprises:
    mapping the plurality of reconstructed luma samples to a plurality of reconstructed neighbor luma samples; and
    mapping the plurality of reconstructed neighbor luma samples to the plurality of neighbor chroma samples.

3. The method of claim 1, wherein identifying the plurality of smallest-difference reconstructed neighbor luma samples comprises: determining the plurality of smallest-difference reconstructed neighbor luma samples according to at least one of: sum of absolute difference (SAD) measurements or sum of squared error (SSE) measurements.

4. The method of claim 1, wherein mapping the plurality of reconstructed luma samples to the plurality of neighbor chroma samples comprises: mapping a patch of reconstructed luma samples to a patch of neighbor reconstructed luma samples.

5. The method of claim 4, wherein the patch of neighbor reconstructed luma samples comprises a smallest-difference patch, the smallest-difference patch corresponding to the patch of reconstructed luma samples.

6. The method of claim 5, further comprising: determining the smallest-distance patch based on a center luma sample of the patch of reconstructed luma samples and a center luma sample of the smallest-difference patch.

7. The method of claim 2, wherein the plurality of reconstructed neighbor luma samples comprises less than all types of reconstructed neighbor luma samples.

8. The method of claim 7, wherein the less than all types of reconstructed luma samples comprises at least one of: left reconstructed neighbor luma samples, above reconstructed neighbor luma samples, or above-left reconstructed neighbor luma samples.

9. The method of claim 2, wherein the plurality of reconstructed neighbor luma samples are in a nearest adjacent reference line.

10. A method of video encoding, the method comprising:
determining that a chroma block is to be predicted in a Chroma from Luma (CfL) mode, wherein the chroma block corresponds to a luma block;
determining a plurality of reconstructed neighbor luma samples by identifying a plurality of smallest-difference reconstructed neighbor luma samples of the luma block, including:
identifying multiple smallest-difference reconstructed neighbor luma samples;
selecting a target smallest-difference reconstructed neighbor luma sample from among the multiple smallest-different reconstructed neighbor luma samples in accordance with the target smallest-difference reconstructed neighbor luma sample having a smallest distance to the luma sample among the multiple smallest-difference reconstructed neighbor luma samples; and
including the target smallest-difference reconstructed neighbor luma sample in the plurality of smallest-difference reconstructed neighbor luma samples;
mapping the plurality of reconstructed luma samples of the luma block to a plurality of neighbor chroma samples in at least one neighbor chroma block that neighbors the chroma block; and
performing a CfL prediction of the chroma block using the plurality of neighbor chroma samples as a plurality of prediction samples of the chroma block.

11. The method of claim 10, wherein the mapping comprises:
mapping the plurality of reconstructed luma samples to a plurality of reconstructed neighbor luma samples; and
mapping the plurality of reconstructed neighbor luma samples to the plurality of neighbor chroma samples.

12. The method of claim 11, wherein the plurality of reconstructed neighbor luma samples are in a nearest adjacent reference line.

13. The method of claim 11, wherein the plurality of reconstructed neighbor luma samples comprises less than all types of reconstructed neighbor luma samples.

14. The method of claim 10, wherein mapping the plurality of reconstructed luma samples to the plurality of neighbor chroma samples comprises mapping a patch of reconstructed luma samples to a patch of neighbor reconstructed luma samples.

15. The method of claim 14, wherein the patch of neighbor reconstructed luma samples comprises a smallest-difference patch, the smallest-difference patch corresponding to the patch of reconstructed luma samples.

16. The method of claim 15, further comprising determining the smallest-distance patch based on a center luma sample of the patch of reconstructed luma samples and a center luma sample of the smallest-difference patch.

17. A method of visual processing, the method comprising:
obtaining a source video sequence that comprises a plurality of frames; and
performing a conversion between the source video sequence and a video bitstream of visual media data according to a format rule,
wherein the video bitstream comprises a set of encoded blocks including a chroma block and a corresponding luma block; and
wherein the format rule specifies that:
the chroma block is to be predicted in a Chroma from Luma (CfL) mode;
a plurality of reconstructed neighbor luma samples is to be determined by identifying a plurality of smallest-difference reconstructed neighbor luma samples of the luma block, including:
identifying multiple smallest-difference reconstructed neighbor luma samples;
selecting a target smallest-difference reconstructed neighbor luma sample from among the multiple smallest-different reconstructed neighbor luma samples in accordance with the target smallest-difference reconstructed neighbor luma sample having a smallest distance to the luma sample among the multiple smallest-difference reconstructed neighbor luma samples; and
including the target smallest-difference reconstructed neighbor luma sample in the plurality of smallest-difference reconstructed neighbor luma samples;
the plurality of luma samples of the luma block is to be mapped to a plurality of neighbor chroma samples in at least one neighbor chroma block that neighbors the chroma block; and
a CfL prediction for the chroma block is to be performed using the plurality of neighbor chroma samples as a plurality of prediction samples of the chroma block.

18. The method of claim 17, wherein mapping the plurality of reconstructed luma samples to the plurality of neighbor chroma samples comprises: mapping a patch of reconstructed luma samples to a patch of neighbor reconstructed luma samples.

19. The method of claim 18, wherein the patch of neighbor reconstructed luma samples comprises a smallest-difference patch, the smallest-difference patch corresponding to the patch of reconstructed luma samples.

20. The method of claim 17, wherein the plurality of reconstructed neighbor luma samples comprises less than all types of reconstructed neighbor luma samples.

* * * * *